US012764814B2

(12) United States Patent
Kneckt et al.

(10) Patent No.: US 12,764,814 B2
(45) Date of Patent: Oct. 13, 2026

(54) TRIGGERED MULTI-LINK ACCESS COORDINATION

(71) Applicant: Apple Inc., Cupertino, CA (US)

(72) Inventors: Jarkko L. Kneckt, Los Gatos, CA (US); Jinjing Jiang, Campbell, CA (US); Noam Ginsburg, Haifa (IL); Qi Wang, Sunnyvale, CA (US); Su Khiong Yong, Palo Alto, CA (US); Yoel Boger, Shoham (IL); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 18/079,518

(22) Filed: Dec. 12, 2022

(65) Prior Publication Data

US 2023/0262805 A1 Aug. 17, 2023

Related U.S. Application Data

(60) Provisional application No. 63/309,421, filed on Feb. 11, 2022.

(51) Int. Cl.
*H04W 76/15* (2018.01)
*H04W 28/02* (2009.01)
*H04W 28/26* (2009.01)

(52) U.S. Cl.
CPC ....... *H04W 76/15* (2018.02); *H04W 28/0278* (2013.01); *H04W 28/26* (2013.01)

(58) Field of Classification Search
CPC . H04W 76/15; H04W 28/0278; H04W 28/26; H04W 84/12; Y02D 30/70
See application file for complete search history.

(56) References Cited

U.S. PATENT DOCUMENTS

2021/0211914 A1* 7/2021 de la Oliva ............. H04L 67/10
2021/0282119 A1* 9/2021 Asterjadhi ............ H04W 76/40
(Continued)

FOREIGN PATENT DOCUMENTS

CN 107113882 A 8/2017
WO WO 2021/246656 A1 12/2021
WO WO 2022/032150 A1 2/2022

OTHER PUBLICATIONS

Extended European Search Report directed to related European Application No. 23151304.5, mailed on Jun. 15, 2023, 12 pages.
(Continued)

*Primary Examiner* — Sudesh M. Patidar
(74) *Attorney, Agent, or Firm* — Sterne, Kessler, Goldstein & Fox P.L.L.C.

(57) ABSTRACT

Embodiments are disclosed for triggered multi-link (ML) access coordination. A station (STA) ML device (MLD) can establish a preferred triggering link (PTL) with an access point (AP) MLD where the PTL is the preferred link for receiving triggering frames. The STA MLD can transmit uplink (UL) frames via the PTL in response to a trigger frame. Subsequently, the STA MLD can determine that the PTL is busy, and transmit enhanced distributed channel access (EDCA) UL frames on a non-PTL link. In a power save mode, the STA MLD can use the PTL to exchange UL and downlink (DL) frames. Multiple PTLs can be established supporting concurrent trigger frames, and different ranges of traffic IDs (TIDs) can be used for each PTL. The STA MLD can utilize AP MLD link pair information to receive a DL retransmission corresponding to one TID via both links of the AP MLD link pair.

20 Claims, 14 Drawing Sheets

(56) References Cited

U.S. PATENT DOCUMENTS

| | | | | |
|---|---|---|---|---|
| 2021/0314106 | A1* | 10/2021 | Fong | H04W 72/23 |
| 2022/0322106 | A1* | 10/2022 | Huang | H04W 16/28 |
| 2022/0394795 | A1* | 12/2022 | Kim | H04W 74/0808 |
| 2023/0018719 | A1* | 1/2023 | Seok | H04W 76/30 |
| 2023/0043239 | A1* | 2/2023 | Lu | H04W 74/002 |
| 2023/0054755 | A1* | 2/2023 | Patil | H04W 76/15 |
| 2023/0114284 | A1* | 4/2023 | Kim | H04W 74/0808 370/329 |
| 2023/0199641 | A1* | 6/2023 | Naik | H04W 76/15 370/318 |
| 2023/0209391 | A1 | 6/2023 | Kim et al. | |
| 2023/0354160 | A1* | 11/2023 | Gan | H04W 76/15 |
| 2024/0107606 | A1* | 3/2024 | Du | H04W 74/08 |
| 2024/0291763 | A1* | 8/2024 | Viger | H04L 47/24 |
| 2025/0008584 | A1* | 1/2025 | Dong | H04W 76/15 |

OTHER PUBLICATIONS

IEEE Standard for Information technology—Telecommunications and information exchange between systems Local and metropolitan area networks—Specific requirements—Part 11: Wireless LAN Medium Access Control (MAC) and Physical Layer (PHY) Specifications, in IEEE Std 802.11-2016 (Revision of IEEE Std 802.11-2012), vol. no., pp. 1-3534, Dec. 14, 2016.

Office Action directed to Chinese Application No. 202310100358.0, mailed Sep. 13, 2025, with machine translation attached; 22 pages.

* cited by examiner

TRIGGERED MULTI-LINK ACCESS COORDINATION

CROSS-REFERENCE TO RELATED APPLICATION

This application claims benefit of U.S. Provisional Patent Application No. 63/309,421, filed on Feb. 11, 2022, which is incorporated herein by reference in its entirety.

BACKGROUND

Field

The embodiments relate generally to wireless devices coordinating triggered multi-link access in a wireless communication system.

Related Art

Wireless local area network (WLAN) communications are described in IEEE P802.11REVme_D0.0, Draft Standard for Information technology—Telecommunications and information exchange between systems Local and metropolitan area networks—Specific requirements, Part 11: Wireless LAN Medium Access Control (MAC) and Physical Layer (PHY) Specifications "IEEE P802.11REVme".

SUMMARY

Some embodiments include an apparatus, method, and computer program product for triggered multi-link (ML) access coordination. In some examples, a station (STA) multi-link device (MLD) can inform an access point (AP) MLD of a preferred triggering link (PTL) of the multiple links of the station MLD, over which the STA MLD prefers to receive trigger frames. For example, the STA MLD can transmit an indication of the PTL corresponding to a first transceiver of two or more transceivers of the station MLD. The STA MLD can receive a first trigger frame via the PTL, and in response to the first trigger frame, transmit first uplink (UL) data stored in a buffer corresponding to the PTL via the PTL. The transmission of the indication of the PTL can be via an A-Control field or via a management frame. The PTL may correspond to a link with a lower co-existence usage compared to remaining links associated with respective ones of the two or more transceivers.

In some embodiments, the STA MLD can determine that the PTL is busy (e.g., being used by another device), and the STA MLD can transmit second UL data via a second link of a second transceiver of the two or more transceivers. When the STA MLD is in a power save mode (e.g., all STAs of the STA MLD are in power save mode), the STA MLD can receive downlink (DL) frames via the PTL.

In some embodiments, the STA MLD can receive a second trigger frame on a second link, where the second trigger frame corresponds to a long resource duration. In response to the second trigger frame, STA MLD can move second UL data already stored in the buffer corresponding to the PTL, to the second link, and transmit the second UL data via the second link. In some examples, the STA MLD can use a first traffic ID (TID) to transmit the first UL data via the PTL, and a second TID to transmit the second UL data via the second link. In some examples, the PTL corresponds to a first range of TIDs, and the STA MLD can receive concurrently with the first trigger frame, a second trigger frame via a second PTL corresponding to a second transceiver of the two or more transceivers. The second PTL can correspond to a second range of TIDs, and the STA MLD can transmit second UL data via the second PTL using a TID of the second range of TIDs.

In some embodiments, the STA MLD can receive a communication signal comprising an AP MLD link-pair corresponding to the PTL and another link of the two or more transceivers. The STA MLD can receive a DL retransmission corresponding to one TID via both links of the AP MLD link-pair.

In some embodiments, the STA MLD can receive a second trigger frame via the PTL while transmitting second UL data on another link via a second transceiver of the two or more transceivers. The STA MLD can transmit an error message in response to the second trigger frame, and transmit third UL data via the PTL in the remaining transmission time of a reserved resource unit (RU) corresponding to the second trigger frame. In some examples, the STA MLD can receive a second trigger frame via the PTL while transmitting second UL data on an other link via a second transceiver of the two or more transceivers, and transmit a Buffer Status Report (BSR) and Quality of Service (QoS) Null frames for a duration of the reserved RU corresponding to the second trigger frame. In some examples, the STA MLD can receive a second trigger frame via the PTL while transmitting second UL data on another link via a second transceiver of the two or more transceivers, calculate statistics comprising link-specific and trigger-frame specific statistics, and transmit the statistics.

In some embodiments, an AP MLD can receive from a STA MLD, an indication of a PTL corresponding to a first transceiver of the two or more transceivers. The AP MLD can prepare buffered DL frames for transmission via the PTL. The AP MLD can transmit a first trigger frame via the PTL, and in response to the first trigger frame, receive first UL data via the PTL. In some examples where the PTL corresponds to a first range of TIDs, the AP MLD can transmit concurrently with the first trigger frame, a second trigger frame via a second PTL corresponding to a second transceiver of the two or more transceivers. In some examples, the second PTL corresponds to a second range of TIDs, and the AP MLD can receive second UL data via the second PTL using a TID of the second range of TIDs.

In some embodiments, the AP MLD can transmit a communication signal comprising an AP MLD link-pair corresponding to the PTL and another link associated with a respective one of the two or more transceivers, where transceivers (e.g., APs) corresponding to the AP MLD link-pair reside on a common chip. The AP MLD can transmit a DL retransmission corresponding to one TID via both links of the AP MLD link-pair.

In some embodiments, the AP MLD can transmit a second trigger frame via the PTL, receive an error message in response to the second trigger frame, and receive third UL data via the PTL in a remaining transmission time of a reserved RU corresponding to the second trigger frame. In some examples, AP MLD may transmit the second trigger frame via the PTL while concurrently receiving UL data via another link of the AP MLD. In some embodiments, the AP MLD can transmit a second trigger frame via the PTL, and receive a Buffer Status Report (BSR) and Quality of Service (QoS) Null frames for a duration of a reserved RU corresponding to the second trigger frame, and/or receive link-specific and trigger-frame specific statistics.

Further embodiments, features, and advantages of the present disclosure, as well as the structure and operation of the various embodiments of the present disclosure, are described in detail below with reference to the accompanying drawings.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
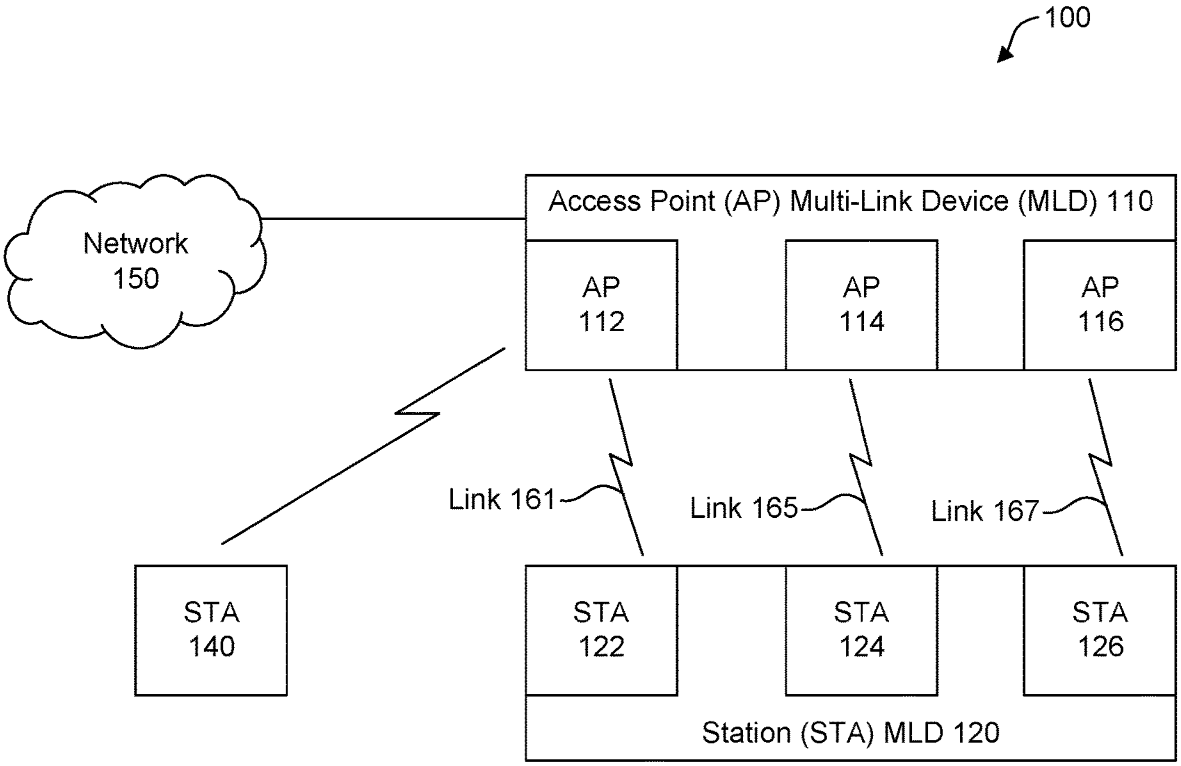
FIG. 1 illustrates an example system for triggered multi-link (ML) access coordination, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include an apparatus, method, and computer program product for triggered multi-link (ML) access coordination. Stations (e.g., user equipment (UE)) can contend for access to a wireless network and use enhanced distributed channel access (EDCA) for uplink (UL) transmissions. A station (STA) ML device (MLD) that includes multiple stations and corresponding links, can support multi-user (MU) EDCA. But, a STA MLD may have difficulties responding to trigger frames on different links concurrently with the same traffic ID (TID). In other words, a STA MLD may not support simultaneous transmission of data with the same TID (e.g., a same Quality of Service (QoS) class) on two or more links. Simultaneous transmissions in two or more links would require separating sets of data within the same data buffer. But, sharing sets of data to more than one link at a time may not be possible.

Some embodiments enable a STA MLD to manage and coordinate triggered ML access. For example, a STA MLD may determine a link that is preferred for receiving trigger frames, define a number of links in which an access point (AP) MLD may simultaneously trigger the STA MLD, and/or provide signals to the AP MLD when a response to a trigger frame incurs an error and/or is not transmitted.

FIG. 1 illustrates example system 100 for triggered ML access coordination, in accordance with some embodiments of the disclosure. System 100 includes AP MLD 110 that provides STA MLD 120, and STA 140 with access to network 150. AP MLD 110 may include multiple APs that each correspond to a particular different link. For example, AP 112 can communicate via 2.4 GHz identified by link 161 with STA 122; AP 114 can communicate via 5 GHz identified by link 165 with STA 124; and AP 116 can communicate via 6 GHz identified by link 167 with STA 126. AP 112, AP 114, and AP 116 may each have a radio transceiver that operates independently from the other radio transceivers. For example, AP MLD 110 can utilize one or more radios (e.g., 3 transceivers) to communicate over multiple links (e.g., over one or more frequency bands) to STA MLD 120. For example, AP MLD 110 can utilize transceivers of AP 112, AP 114, and/or AP 116 to communicate with STA MLD 120 via link 161, link 165, and/or link 167.

STA MLD 120 and STA 140 in proximity to AP MLD 110 may associate with AP MLD 110. For example, STA MLD 120 can scan and identify AP MLD 110 across all three links. After associating with AP MLD 110, STA MLD 120 can communicate via any of the links link 161, link 165, and/or link 167 that are available in, for example, three different frequency bands, e.g., 2.4 GHz, 5 GHz, and 6 GHz. If one link is busy, STA MLD 120 or AP MLD 110 selects another link that is first available.

STA 140 can be a non-MLD STA (e.g., a STA with a single transceiver). STA 140 may communicate with AP MLD 110 via one of AP 112, AP 114, or AP 116. STA MLD 120 and/or STA 140, can be electronic devices that may include but are not limited to a cellular phone, a smart phone, a tablet, a personal digital assistant (PDA), or a laptop. Network 150 may include but is not limited to, any of or any combination of local area networks (LANs), metropolitan area networks (MANs), wireless local area networks (WLANs), and/or the Internet. In some embodiments, AP 110 may not be a MLD, where AP 110 may include a single transceiver.

Figure 2:
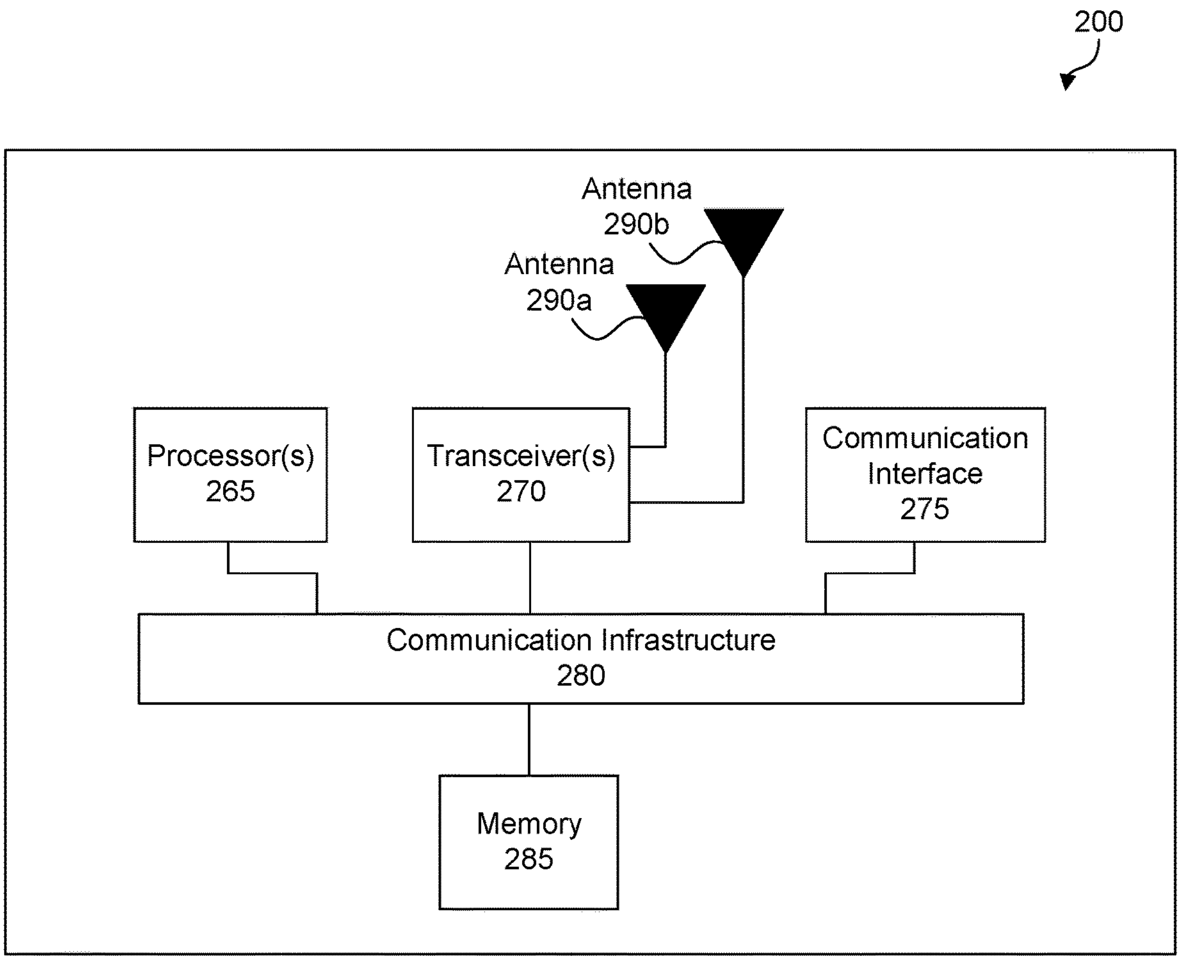
FIG. 2 illustrates a block diagram of an example wireless system supporting triggered ML access coordination, according to some embodiments of the disclosure.

FIG. 2 illustrates a block diagram of example wireless system 200 supporting triggered ML access coordination, according to some embodiments of the disclosure. For explanation purposes and not a limitation, FIG. 2 may be described with reference to elements from FIG. 1. For example, system 200 may be any of the electronic devices: AP MLD 110, AP 112, AP 114, AP 116, STA MLD 120, STA 122, STA 124, STA 126, or STA 140 of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the functions for triggered ML access coordination described herein. In some embodiments, one or more processors 265 can be "hard coded" to perform the functions herein. Transceiver(s) 270 transmits and receives wireless communications signals including wireless communications supporting triggered ML access coordination according to some embodiments, and may be coupled to one or more antennas 290 (e.g., 290*a*, 290*b*). In some embodiments, a transceiver 270*a* (not shown) may be coupled to antenna 290*a* and different transceiver 270*b* (not shown) can be coupled to antenna 290*b*. Communication interface 275 allows system 200 to communicate with other devices that may be wired and/or wireless. Communication infrastructure 280 may be a bus. Antenna 290 may include one or more antennas that may be the same or different types.

Figure 9A:
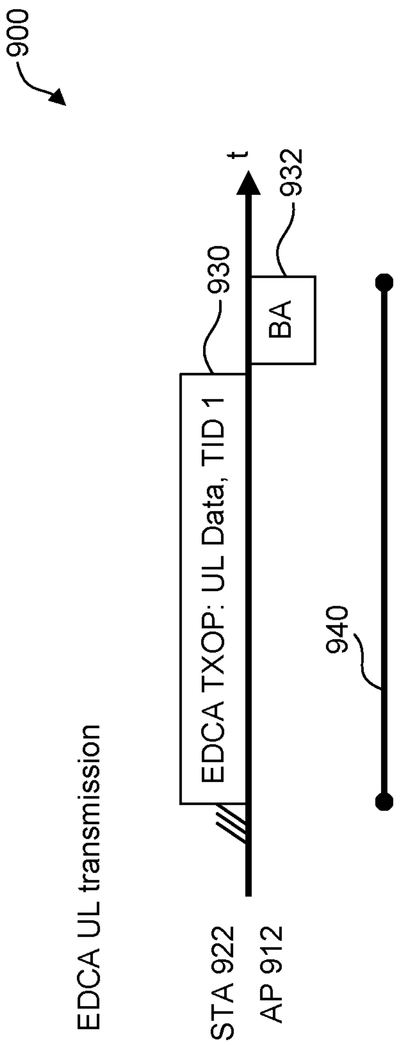
FIG. 9A illustrates an example of an enhanced distributed channel access (EDCA) uplink (UL) transmission, according to some embodiments of the disclosure.

FIG. 9A illustrates example 900 of an EDCA uplink (UL) transmission, according to some embodiments of the disclosure. For explanation purposes and not a limitation, example 900 may be described with reference to elements from other figures in the disclosure. For example, AP 912 and STA 922 may correspond to AP 112 and STA 122 of FIG. 1. STA 922 may transmit UL data using traffic ID (TID) 1 via EDCA transmission opportunity (TXOP) 930. STA 922 controls the aspects of EDCA TXOP 930 including but not limited to the modulation coding scheme (MCS), number of special streams (NSS), transmit (TX) power, bandwidth, and the TID value. AP 912 receives the EDCA TXOP 930 and transmits a block acknowledgement (BA) 932 in response. Time duration 940 illustrates a flexible TXOP start time and duration including BA 932. In short, transmitter STA 922 controls the aspects of the UL EDCA transmission in a ML environment. This is in contrast to a triggered ML UL transmission discussed in FIG. 9B where the AP that transmits a ML trigger frame controls aspects (e.g., specifics 985) of the triggered UL response.

Figure 9B:
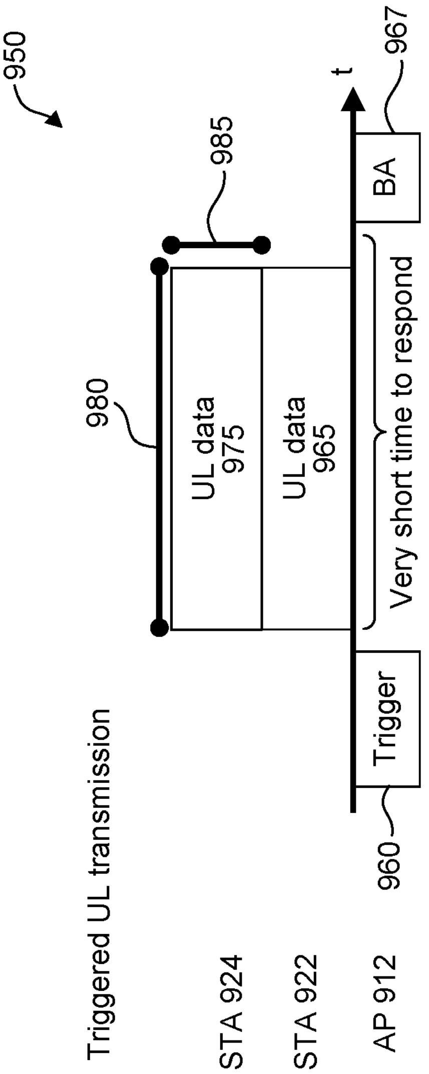
FIG. 9B illustrates an example of triggered ML UL transmission, according to some embodiments of the disclosure.

FIG. 9B illustrates example 950 of triggered ML UL transmission, according to some embodiments of the disclosure. For explanation purposes and not a limitation, example 950 may be described with reference to elements from other figures in the disclosure. For example, AP 912, STA 922, and STA 924 may correspond to AP 112, STA 122, and STA 124 of FIG. 1. Example 950 illustrates trigger frame 960 that is transmitted from AP 912. In response, STAs 922 and 924 are triggered to transmit respective UL data 965 and 975, which are restricted to time duration 980 of an exact resource unit (RU) duration. Further, AP 912 (and/or a corresponding AP MLD (e.g., AP MLD 110) of which AP 912 is a part) sets specifics 985 of the RU, MCS, NSS, and TX power. The corresponding STA MLD (e.g., STA MLD 120) may have limited ML UL data transmission capability and may not be able to respond in the relatively short time after the trigger frame 960 is received. AP 912 transmits BA 967 in response to the UL data 965 and 975 received. Further, STA MLD 120 may not be capable of transmitting UL data 965 and UL data 975 using the same TID at the same time. Embodiments herein enable coordinated responses to trigger frames in a ML environment.

Figure 3:
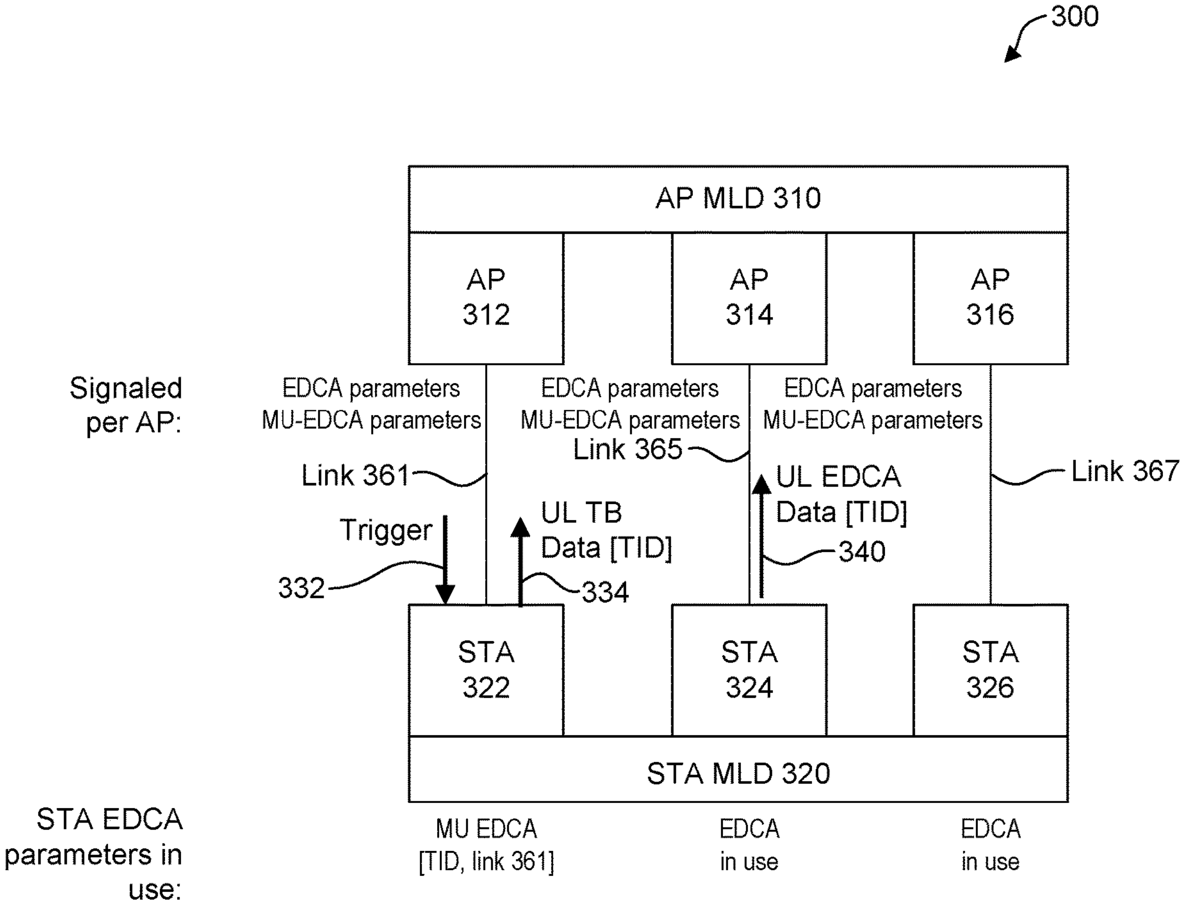
FIG. 3 illustrates a preferred triggering link (PTL) example for triggered ML access coordination, according to some embodiments of the disclosure.

FIG. 3 illustrates preferred triggering link (PTL) example 300 for triggered ML access coordination, according to some embodiments of the disclosure. For explanation purposes and not a limitation, FIG. 3 may be described with reference to elements from FIGS. 1 and 2. For example, AP MLD 310, AP 312, AP 314, AP 316, STA MLD 320, STA 322, STA 324, and STA 326 of FIG. 3 may correspond to AP MLD 110, AP 112, AP 114, AP 116, STA MLD 120, STA 122, STA 124, and STA 126 of FIG. 1 and/or system 200 of FIG. 2. In example 300, AP 312, AP 314, and AP 316 can signal EDCA parameters and MU-EDCA parameters to corresponding STA 322, STA 324, and STA 326.

In some embodiments, STA MLD 320 informs AP MLD 310 of a PTL on which STA MLD 320 prefers to receive trigger frames. The PTL may be selected as the link corresponding to a buffer where UL data resides, and/or the PTL may be selected as the link with a lower or the least co-existence activity (e.g., peer-to-peer communications). For example, if STA MLD 320 utilizes link 361 at 2.4 GHz and/or link 365 at 5 GHz for peer-to-peer communications often, then STA MLD 320 may select a different link such as link 367 at 6 GHz) as the PTL.

In example 300, it is assumed that STA MLD 320 has UL data buffered at STA 322 for transmission on link 361, so STA MLD 320 selects link 361 as the PTL. STA MLD 320 can transmit a PTL request to AP MLD 310, which acknowledges the PTL request. Subsequently, STA MLD 320 expects to receive triggered frames via the PTL, namely link 361. When trigger frame 332 is received via link 361, STA 322 immediately transmits response 334 that includes UL trigger-based (TB) data and a TID.

Figure 4A:
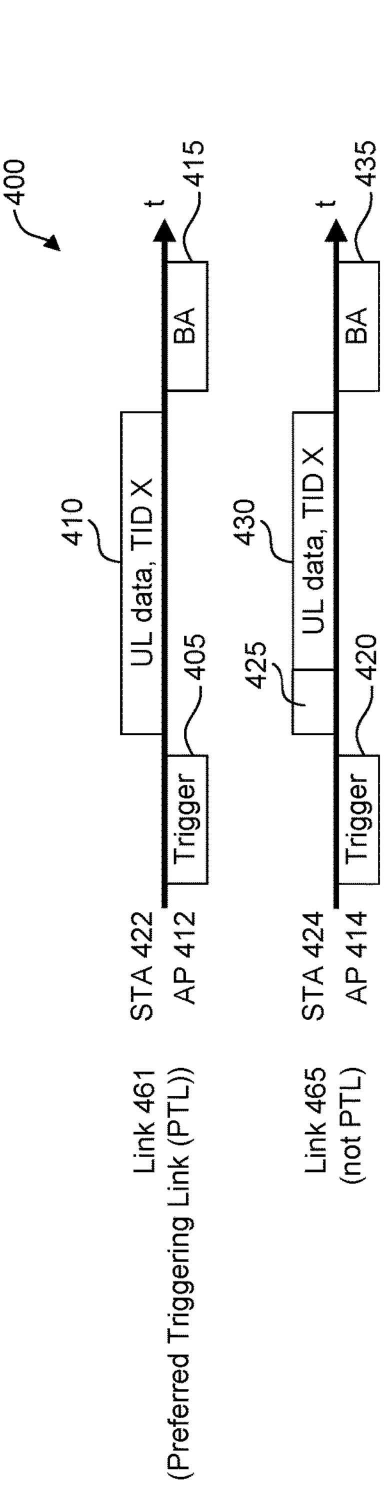
FIG. 4A illustrates an example of using PTL for triggered ML access coordination, according to some embodiments of the disclosure.

FIG. 4A illustrates example 400 of using PTL for triggered ML access coordination, according to some embodiments of the disclosure. For explanation purposes and not a limitation, FIG. 4A may be described with reference to elements from other figures. For example, STA 422, STA 424, AP 412, AP 414, link 461, and link 465 may correspond to STA 322, STA 324, AP 312, AP 314, link 361, and link 365 of FIG. 3.

Example 400 illustrates AP 412 transmitting trigger frame 405 on the PTL link 461.

STA 422 receives trigger frame 405 and transmits UL data 410 in response.

AP 412 receives UL data 410 and transmits block acknowledgement (BA) 415 according to UL data 410 received.

Establishing a PTL (e.g., link 461) does not prevent an AP MLD from transmitting a trigger frame on a different link to STA MLD.

An AP MLD can transmit a trigger frame on another link that is not the PTL, even though the other link is not ideal for the STA MLD. In some embodiments, the STA MLD does not respond to trigger frames received outside of the PTL.

Continuing with example 400, AP 414 can transmit trigger frame 420 to STA 424 via link 465 which is not the PTL. The STA MLD (e.g., STA MLD 320) first moves any UL data from a buffer corresponding to the PTL (link 661) during delay time 425, and then transmits the moved UL data in UL data 430 in the remaining time of the RU corresponding to trigger frame 420.

AP 414 receives UL data 430 and transmits BA 435 in response.

A trigger frame (e.g., trigger frame 420) should allocate a resource unit (RU) (e.g., a long resource duration) that is long enough to move UL data during delay time 425 from the PTL (e.g., link 461) to link 465. Note that receiving a trigger frame via the PTL saves delay time 425 during which the allocated transmission RU is not used, and also saves resources (e.g., power) from having to move UL data away from the buffer corresponding to the PTL to link 465.

Returning to example 300, AP MLD 310 may advertise MU EDCA parameters via the PTL. When the STA 322 responds to triggering frame 332 in the PTL with UL TB data 334 on access category 1 (AC1) that may include traffic, for instance, from TIDs 0 and 3, then the STA should use MU EDCA parameters (AIFS, CWmin and CWmax for example) to obtain EDCA TXOPs for the AC1 (e.g., TIDs 0 and 3) in the PTL. The use of the MU EDCA parameters may result in poor EDCA performance on the PTL. As shown in example 300, the STA EDCA parameters STA 322 utilizes MU EDCA and STAs 324 and 326 use EDCA.

In some embodiments, when the PTL is busy (e.g., with ongoing transmissions) and/or when AP MLD 310 transmits trigger frames and MU EDCA parameters on the PTL, STA MLD 320 can determine whether the PTL is busy. When the PTL is busy, STA MLD 320 can transmit UL data with EDCA on another link other than the PTL.

In example 300, when STA 322 detects that some other device (e.g., STA 140 of FIG. 1 not shown in FIG. 3) is transmitting in PTL link 361, STA MLD 320 determines that PTL link 361 is busy, and STA MLD 320 may transmit UL data 340 via link 365 of STA 324.

Figure 4B:
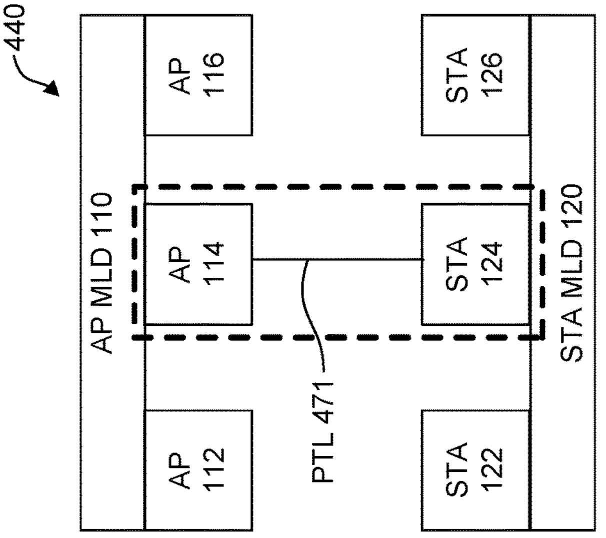
FIG. 4B illustrates an example of PTL use in a power save mode, according to some embodiments of the disclosure.

FIG. 4B illustrates example 440 of PTL use in a power save mode, according to some embodiments of the disclosure. For explanation purposes and not a limitation, FIG. 4B may be described with reference to elements from other figures such as AP MLD 110 and STA MLD 120 of FIG. 1. In some embodiments, when STA MLD 120 enters a power saving mode (e.g., all STAs affiliated with the STA MLD enter a power saving mode), STA MLD 120 may use the PTL by default to exchange UL and downlink (DL) data. In example 440, PTL 471 has been established between AP 114 and STA 124. AP MLD 110 can prepare buffered DL frames ready for delivery via PTL 471. When STA MLD 120 is in a power save mode and obtains UL frames for transmission, STA 124 may wake up to transmit the UL frames via PTL 471. The UL frames may include signaling, for instance Power Management bit in the MAC Header of the transmitted frames is set to 1, and this signaling indicates to AP MLD 110 that AP MLD 110 may send buffered frames to the STA. Subsequently, STA 124 may obtain DL frames that were buffered by AP MLD 110 at AP 114. The buffered DL frames on the PTL may reduce the duration that STA 124 operates in awake state.

In some embodiments, when no PTL is configured, AP MLD 110 may include a link recommendation in a beacon frame where the link recommendation indicates a link from which STA MLD 120 fetches buffered DL frames. But STA MLD 120 may rarely receive beacons or only receive Delivery Traffic Indication Message (DTIM) beacons. Consequently, waiting for the next beacon may add UL transmission delays. The same link may also be used for transmitting triggering frames.

Figure 4C:
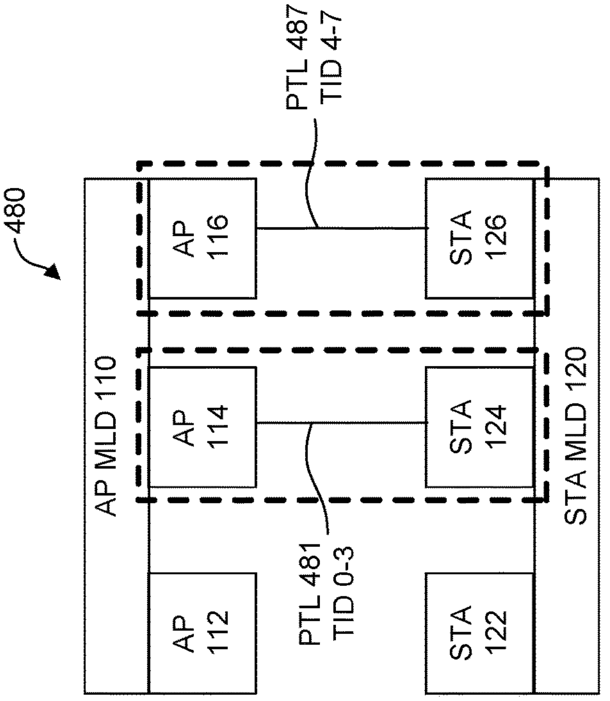
FIG. 4C illustrates an example of traffic ID (TID) specific PTL configurations, according to some embodiments of the disclosure.

FIG. 4C illustrates example 480 of TID-specific PTL configurations, according to some embodiments of the disclosure. For explanation purposes and not a limitation, FIG. 4C may be described with reference to elements from other figures such as AP MLD 110 and STA MLD 120 of FIG. 1. In some embodiments, STA MLD 120 can configure TID-specific PTLs. For example, PTL 481 may be configured to utilize TID 0-3 (e.g., for background and best effort traffic), and PTL 487 is configured to use TID 4-7 (e.g., for low latency traffic.) Thus, TID-specific PTL 487 is used to transmit only high TID traffic. In some embodiments, STA MLD 120 may have up to 15 simultaneous links responding to trigger frames. In some embodiments, if STA MLD 120 can transmit multi-TID transmissions, then in long RUs, STA MLD 120 may first transmit the TID configured for the PTL, and continue data transmissions on other TIDs. The transmitted TIDs may be on configured TIDs or other TIDs, depending on the STA MLD transmission decisions, QoS requirements of the available UL traffic, and frames fit for the allocated RU.

Figure 5B:
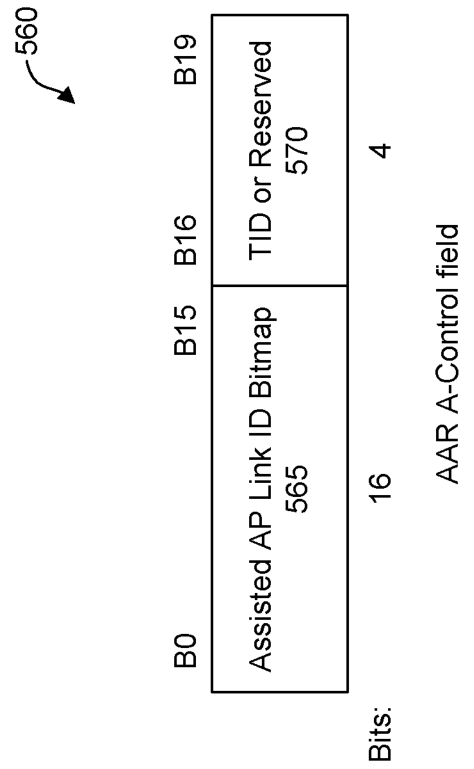
FIG. 5B illustrates an example field for establishing a PTL, according to some embodiments of the disclosure.
Figure 5A:
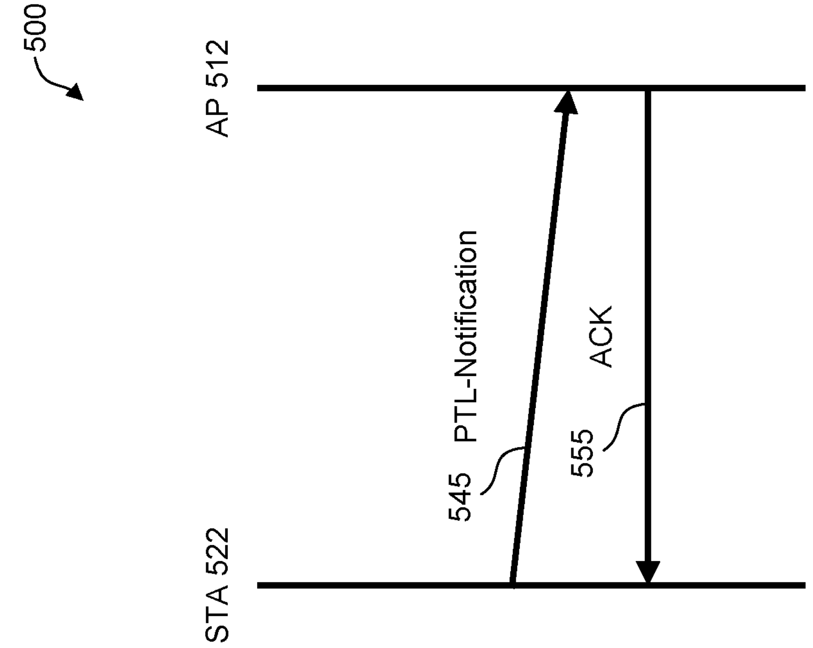
FIG. 5A illustrates an example of signaling for establishing a PTL, according to some embodiments of the disclosure.

FIG. 5A illustrates example 500 of signaling for establishing a PTL, according to some embodiments of the disclosure. For explanation purposes and not a limitation, FIG. 5A may be described with reference to elements from other figures. For example, STA 522 and AP 512 may correspond to STA MLD 120 and AP MLD 110 of FIG. 1. STA 522 can select a PTL based on a link that has UL data prepared for immediate transmission, and/or a link that has lower or the least co-existence issues. STA 522 may transmit PTL-notification message 545 to AP 512. AP 512 may receive PTL-notification message 545, and in response, transmit an acknowledgement (ACK) message 555.

Table 1 illustrates signaling alternatives for establishing a PTL. PTL-Notification 545 may be transmitted via: an A-Control field of a MAC header to signal the PTL, or a management frame signal. In some embodiments, the link from which the last EDCA UL frame was transmitted becomes the PTL.

TABLE 1

| Preferred Triggering Link (PTL) Signaling Alternatives | | | |
|---|---|---|---|
| Preferred triggering link (PTL) signaling alternative | Operation | Advantages | Disadvantages |
| A-Control field signals the PTL | MAC Headers contain A-Control field that signals the PTL | If PTL is busy, UL EDCA on another link has no impact to PTL. STA MLD may set no PTL, if the STA MLD desires to use only EDCA | PTL switch may be slower than the last EDCA transmission defining the PTL alternative |
| Management frame signals the PTL | The STA configures the PTL through separate management frame | | |
| The last EDCA transmission defines the PTL | The link in which the STA has last transmitted UL data for TID is the PTL | Fast PTL switch No signaling overhead | EDCA transmission may not be possible in all links No cross-link signaling UL EDCA on another link changes preferred link, even if not intended |

FIG. 5B illustrates example field 560 for establishing a PTL, according to some embodiments of the disclosure. For explanation purposes and not a limitation, FIG. 5A may be described with reference to elements from other figures such as FIG. 5B. STA 522 may use AP Assisted Recovery (AAR) A-Control field to signal the PTL. The AAR A-Control field may include Assisted AP Link ID bitmap 565, where a value of '1' in the Assisted AP Link ID bitmap 565 indicates a link in which STA 522 prefers to be triggered (e.g., the PTL.) In some embodiments, at least one bit may be set to '1'. In some embodiment, TID or Reserved field 570 may correspond to a TID value (0-15) of the respective PTL of the bitmap. Thus, STA MLD 320 can configure different PTLs for a corresponding TID. In some examples, a TID value of 14 may signal that the PTL corresponding to the bitmap is the default PTL for all TIDs. In some examples, TID or Reserved field 570 includes reserved values.

STA MLD 320 may change the configured PTL by sending a second management frame or AAR A-Control field to the AP. If TID specific PTL configuration is used, each TID may be changed with a separate new signaling, or the signaling may change all TID configurations. STA MLD 320 may stop using PTL by sending a second management frame or AAR A-Control field that signals no PTL to AP MLD 310.

Figure 6A:
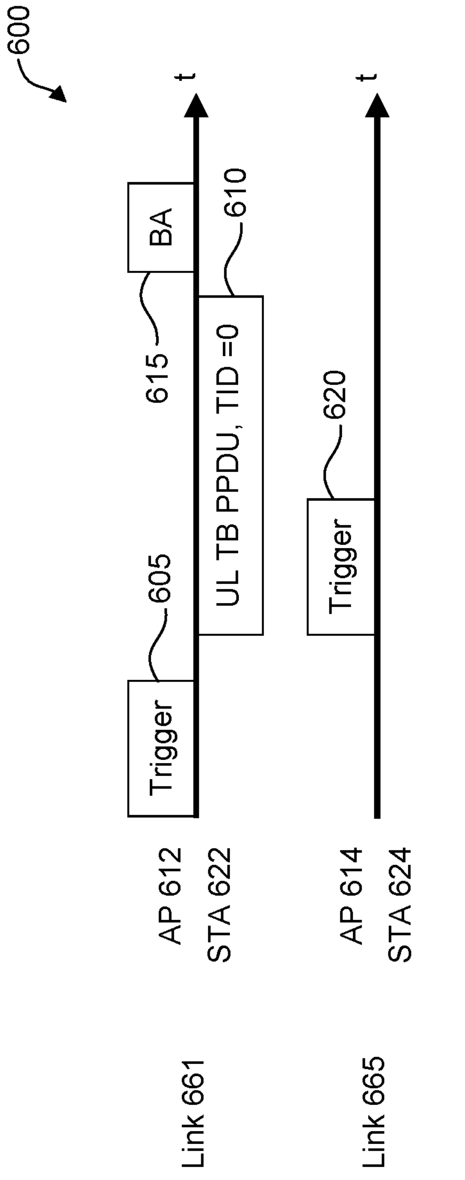
FIG. 6A illustrates a first example of a ML triggering capability, according to some embodiments of the disclosure.

FIG. 6A illustrates example 600 of an ML triggering capability, according to some embodiments of the disclosure. For explanation purposes and not a limitation, FIG. 6A may be described with reference to elements from other figures in the disclosure. For example, STA 622, STA 624, AP 612, AP 614, link 661 and link 665 may correspond to STA 322, STA 324, AP 312, AP 314, link 361 and link 365 corresponding to STA MLD 320 and AP MLD 310 of FIG. 3. In some embodiments, a STA MLD (e.g., STA MLD 320) can signal capabilities to an AP MLD (e.g., AP MLD 310) for responding to concurrent trigger frames in different links. The signaling may be transmitted in an (Re)Association Request frame. In some examples, STA MLD 320 may signal that STA MLD 320 cannot respond to trigger frames simultaneously in all of the multiple links. In some examples, STA MLD 320 cannot transmit UL data with the same TID in multiple links at the same time.

In some embodiments, STA MLD 320 can signal ML simultaneous transmission and reception (STR) data trigger capabilities via ML triggering data triggering capability field values as shown below in Table 2. The value field indicates the number of APs of AP MLD 310 from which STA MLD 320 can receive basic trigger frames.

TABLE 2

| ML STA MLD Level Data Triggering Capability Field Values | |
|---|---|
| Value | Meaning |
| 0 | STA MLD can receive and respond one basic trigger frame at a time |
| 1 | STA MLD can receive and respond concurrently to basic trigger frames, if STA MLD can send data with different TIDs. The STA MLD may not be capable of sending data with the same TID as a response to received trigger frames |
| 2 | STA MLD has no limits on the number of trigger frames that the STA MLD may concurrently receive or respond (e.g., STA MLD can send UL data with a same TID on multiple links) |
| 3 | Reserved |

In example 600, the corresponding STA MLD (not shown) has signaled to AP MLD (not shown) that the ML data triggering capability field value=1, and STA MLD only has buffered UL data with one TID, TID=0 corresponding to link 661.

AP 612 transmits trigger frame 605 on link 661.

STA 622 receives trigger frame 605, and in response, transmits UL trigger-based (TB) data 610 such as a physical layer protocol data unit (PPDU) with data payload from TID=0.

As STA 622 is transmitting UL TB data 610, AP 614 concurrently transmits trigger frame 620 on link 665.

Since STA 624 of link 665 does not have any UL data to transmit, STA 624 does not respond to trigger frame 620.

AP 612 receives UL TB data 610 and transmits BA 615 accordingly.

Figure 6B:
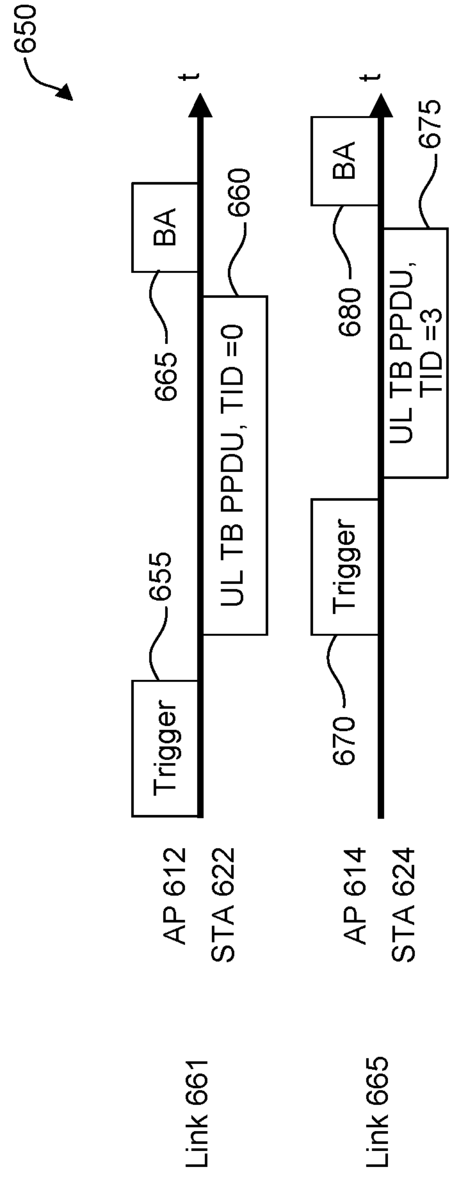
FIG. 6B illustrates a second example of a ML triggering capability, according to some embodiments of the disclosure.

FIG. 6B illustrates example 650 of a ML triggering capability, according to some embodiments of the disclosure. For explanation purposes and not a limitation, FIG. 6B may be described with reference to elements from other figures in the disclosure such as FIG. 6A. In example 650, the corresponding STA MLD (e.g., STA MLD 320) has signaled to AP MLD (e.g., AP MLD 310) that the ML STA MLD data triggering capability field value=1, and STA MLD 320 has buffered UL data with two TIDs: TID=0 corresponding to link 661 and TID=3 corresponding to link 665.

AP 612 transmits trigger frame 655 on link 661.

STA 622 receives trigger frame 655, and in response, transmits UL trigger-based (TB) data 660 such as a PPDU with TID=0.

As STA 622 is transmitting UL TB data 660, AP 614 concurrently transmits trigger frame 670 on link 665.

Since STA 624 of link 665 has UL data to transmit, STA 624 responds to trigger frame 670 by transmitting UL TB data 675 such as a PPDU with TID=3.

AP 612 receives UL TB data 660 and transmits BA 665 accordingly.

AP 614 receives UL TB data 675 and transmits BA 680 accordingly.

In some embodiments, an AP MLD (e.g., AP MLD 310) can signal AP MLD 310's capabilities for ML triggering. The signaled capabilities may help an STA MLD (e.g., STA MLD 320) select a corresponding AP MLD 310, and select a corresponding operating mode for AP MLD 310. For instance, STA MLD 320 may select the PTL or several PTLs based on AP MLD 310 capabilities. The STA MLD 320 may select to activate only a single link to AP MLD 310, because AP MLD 310 does not support triggering in other links. The STA MLD 320 may select the links in which STA MLD 320 is available for triggering and the links that STA MLD 320 only uses for EDCA transmissions. STA MLD 320 may select to transmit data on some TIDs only on selected links.

AP MLD 310 capabilities may be transmitted in a beacon, a probe response, multi-link probe response, and/or a (Re) association response message. The capabilities may be on an MLD level or an AP MLD link-pair level (discussed below). For example, AP MLD 310's MLD-level capabilities are similar to an STA MLD 320's capabilities. For example, STA MLD 320 receives a single response that applies to the APs of AP MLD 310. In other words, AP 312, AP 314, and AP 316 share a same capability value. Further, STA MLD 320 will be informed as to whether AP MLD 310 supports simultaneous triggering frames. Example values for a ML AP MLD level data triggering capability field is shown below in Table 3.

TABLE 3

ML AP MLD Level Data Triggering Capability Field Values

| Value | Meaning |
|---|---|
| 0 | AP MLD can trigger one basic trigger frame per non-AP MLD at a time |
| 1 | AP MLD can trigger concurrent multiple basic trigger frames per STA MLD |
| 2 | AP MLD can coordinate the number of TIDs that the STA MLD has, and can trigger STA MLD per the number of TIDs |
| 3 | Reserved |

Figure 7:
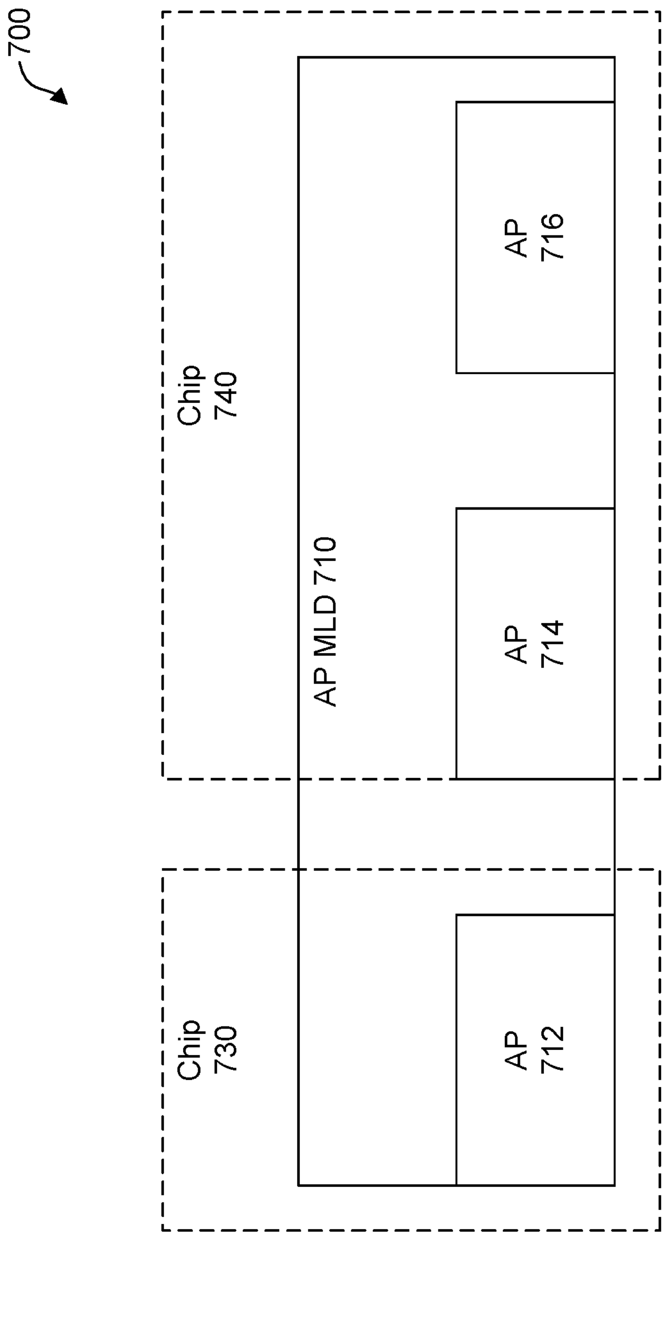
FIG. 7 illustrates an example of access point (AP) ML device (MLD) link-pair capabilities supporting triggered ML access coordination, according to some embodiments of the disclosure.

FIG. 7 illustrates example 700 of AP MLD link-pair capabilities supporting triggered ML access coordination, according to some embodiments of the disclosure. For explanation purposes and not a limitation, FIG. 7 may be described with reference to elements from other figures in the disclosure. For example, AP MLD 710, AP 712, AP 714, and AP 716 may correspond to AP MLD 310, AP 312, AP 314, and AP 316 of FIG. 3. In example 700, AP 712 may be implemented on chip 730 while both AP 714 and AP 716 may be implemented on a single chip, chip 740. AP MLD link-pairs (e.g., AP 714 and AP 716) may have superior capabilities over other APs (e.g., AP 712) because of their cross link communications as shown below in Table 4.

For example, capability sets 1 & 2 may be similar because cross link communication is between two chips (e.g., chip 730 and chip 740.) Capability set 3, however, may have superior capabilities because information is shared within a single chip (e.g., chip 740) which may lower communication delays.

TABLE 4

AP MLD Link-Pair and Capabilities

| Link Pairs | Example of Signaled Capabilities |
|---|---|
| AP 712-AP 714 | Capability Set 1 |
| AP 712-AP 716 | Capability Set 2 |
| AP 714-AP 716 | Capability Set 3 |

In some embodiments, an AP MLD link-pair communication from AP MLD 710 to a counterpart STA MLD (not shown) indicates whether pairs of APs (e.g., AP 714 and AP 716) are capable of sharing information, and the cross link information sharing capabilities. The AP MLD link-pair communication can inform the STA MLD on how well AP 714 and AP 716 exchange information (e.g., example real time information exchange.) The associated stations may benefit from the AP MLD link-pair information by selecting the links corresponding to the AP MLD link-pair for operation, and expecting better triggering (e.g., coordination among AP 714 and AP 716) for fast communications. Examples of AP MLD link-pair scheduling parameters are shown below in Table 5.

TABLE 5

AP MLD Link-Pair Specific Scheduling Parameters

| Feature | Capability | Example Use | Values |
|---|---|---|---|
| Simultaneous triggering coordination | APs of the AP MLD link-pair are capable of controlling ongoing STA triggering based on STA capabilities and BSR signaling. For example, the link-pair APs can quickly determine whether to cancel a trigger frame transmission to a STA (e.g., the STA has no | APs of the AP MLD link-pair are capable of sending one trigger frame per both links, or one trigger frame per buffered UL TID. APs can operate according to STA triggering capability | |

TABLE 5-continued

| AP MLD Link-Pair Specific Scheduling Parameters | | | |
|---|---|---|---|
| Feature | Capability | Example Use | Values |
| | UL data to transmit) or the link-pair APs can quickly determine to trigger a STA because the STA failed to transmit all of the station's UL data | | |
| UL Triggering coordination: Buffer status report (BSR) and UL Block Ack (BA) cross link communication | APs of the AP MLD link-pair can share the information of BSRs that a STA sends. The APs can share the BA status of the UL frames. The APs may also reduce from STA UL buffered data, the amount of data that a STA has sent over (e.g., via) EDCA | APs of the AP MLD link-pair are aware of STA UL buffered data and they can allocate triggered RUs more precisely. APs can reduce the number of transmitted BSRs | 0 = delayed coordination (10-50 ms) 1 = TXOP level coordination (5-10 ms) 2 = real Time coordination (1-5) ms 3 = very low delay coordination (<1 ms) |
| DL BA cross link communication | APs of the AP MLD link-pair are able to schedule DL frames retransmissions based on new DL frames and STA BA information | APs of the AP MLD link-pair know if the DL transmissions need retransmissions and may use both links for the same TID DL traffic transmission | |

Figure 8A:
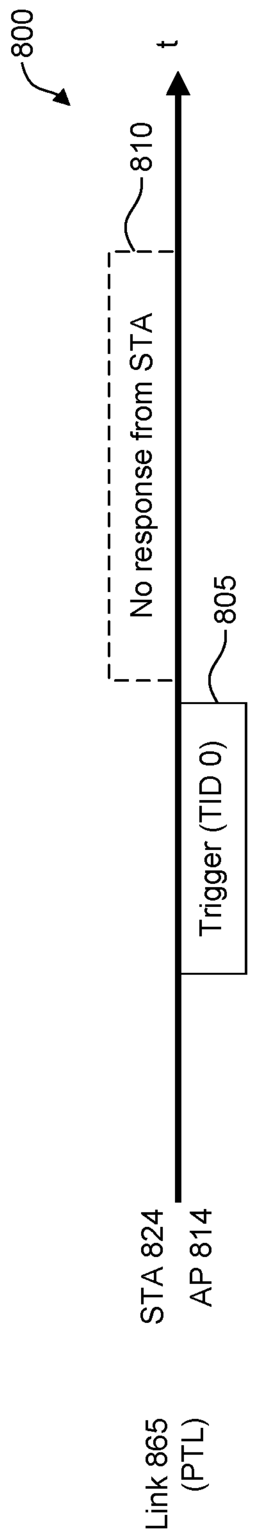
FIG. 8A illustrates an example of an error during a triggering operation, according to some embodiments of the disclosure.

FIG. 8A illustrates example 800 of an error during a triggering operation, according to some embodiments of the disclosure. For explanation purposes and not a limitation, FIG. 8A may be described with reference to elements from other figures in the disclosure. For example, AP 814, STA 824, and link 865 may correspond to AP 314, STA 324, and link 365 of FIG. 3. In some examples, a STA MLD may receive a trigger frame, but may not be able to respond to the trigger frame. For example, AP 814 may transmit trigger frame 805 with TID=0, and not receive a response 810 from STA 824. AP 814 and corresponding AP MLD (e.g., AP MLD 310) may not understand why STA 824 and corresponding STA MLD (e.g., STA MLD 320) did not respond, and consequently AP MLD 310 does not have information to determine whether to make any changes/adjustments. In some embodiments, STA 824 can provide various responses that are described further below.

Figure 8B:
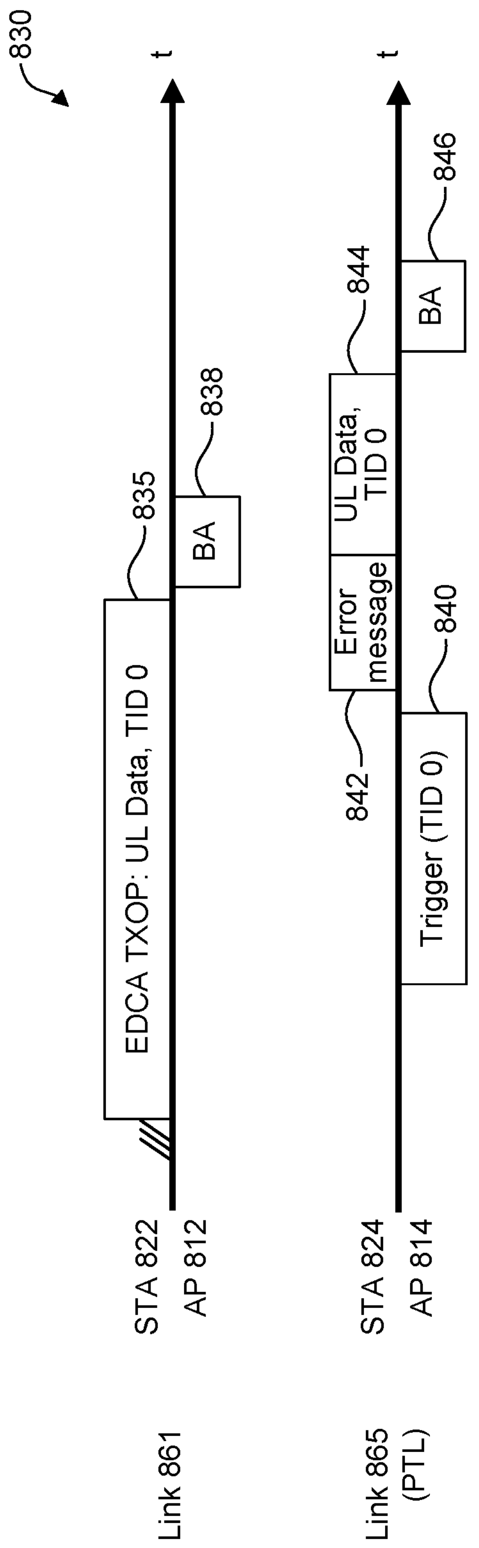
FIG. 8B illustrates an example of transmitting an error message during a triggering operation, according to some embodiments of the disclosure.

FIG. 8B illustrates example 830 of transmitting an error message during a triggering operation, according to some embodiments of the disclosure. For explanation purposes and not a limitation, FIG. 8B may be described with reference to elements from other figures in the disclosure. For example, AP 812, AP 814, STA 822, STA 824, link 861, and link 865 may correspond to AP 312, AP 314, STA 322, STA 324, link 361, and link 365 of FIG. 3. In some embodiments, if a STA MLD (e.g., STA MLD 320) is transmitting data on another link and receives a trigger frame, STA MLD 320 may respond to the trigger frame with an error message during a transmission time of the reserved RU corresponding to the trigger frame. Thus, no additional overhead is incurred. Further, if STA MLD 320 is able, STA MLD 320 may transmit UL frames corresponding to the trigger frame in the remaining transmission time of the reserved RU corresponding to the trigger frame.

In example 830, link 865 is the PTL and STA MLD 320 has buffered UL data on TID=0.

STA 822 may transmit EDCA TXOP 835 with UL data and TID=0, on link 861.

Concurrently, on link 865, AP 814 may transmit trigger frame 840 with TID=0.

STA 824 may transmit error message 842 during the reserved RU corresponding to trigger frame 840, where the error message may indicate that no TID is available. After EDCA TXOP 835 is complete and time remains of the reserved RU, STA 824 may transmit UL data 844 with TID=0, in response to trigger frame 840.

AP 812 may receive EDCA TXOP 835 and transmit BA 838 accordingly.

AP 814 may receive UL data 844 and transmit BA 846 accordingly.

Based on error message 842, AP 814 does not lower the transmission rate since the error message indicated the problem was due to an unavailable TID. AP MLD 310 may schedule subsequent trigger frames at a correct time for the available data.

The content of error message 842 can include but is not limited to the following:

- Type of another transmission (e.g., peer-to-peer (P2P), or infrastructure TX such as EDCA TXOP 835);
- Link of another transmission (e.g., link 861);
- Time when triggered UL data transmission is possible again;
- Buffered traffic amounts and corresponding TIDs;
- Delay bound time remaining to transmit the buffered traffic; and/or
- New PTL for the next transmission.

Figure 8C:
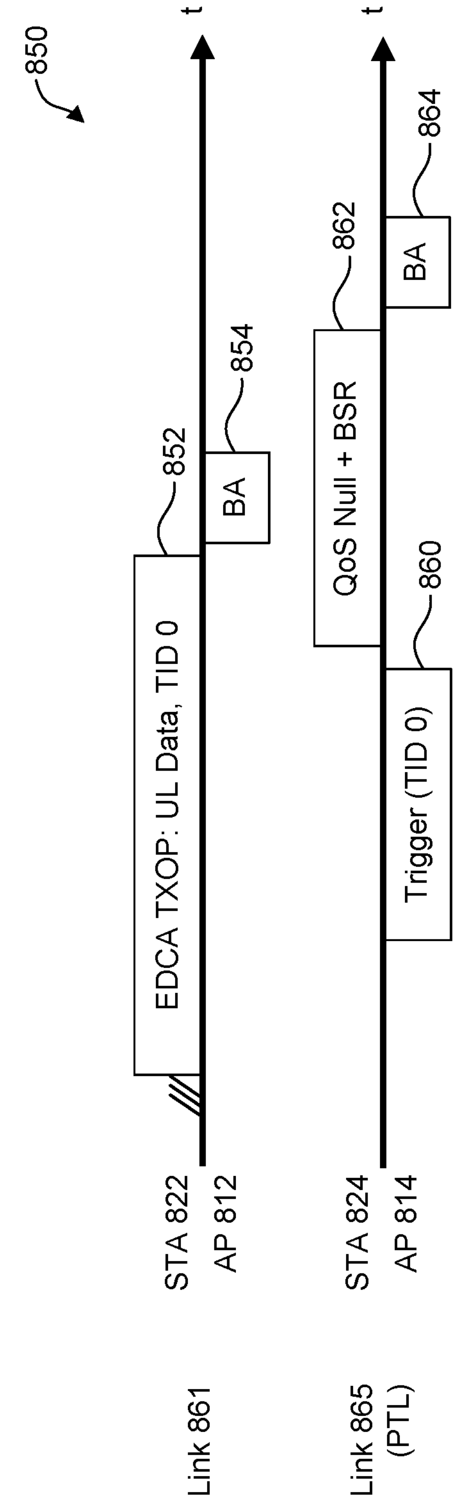
FIG. 8C illustrates an example of transmitting a Buffer Status Report (BSR) during a triggering operation, according to some embodiments of the disclosure.

FIG. 8C illustrates example 850 of transmitting a Buffer Status Report (BSR) during a triggering operation, according to some embodiments of the disclosure. For explanation purposes and not a limitation, FIG. 8C may be described with reference to elements from other figures in the disclosure such as FIG. 8B. In some embodiments, if STA MLD 320 is transmitting data on another link and cannot respond to a trigger frame, STA MLD 320 may respond with a Buffer Status Report (BSR) and signal that STA MLD 320 had data available. Responding with BSR may be simpler than trying to transmit data from STA MLD 320 to AP MLD 310 (e.g., instead of transmitting UL data 844 of example 830.) When AP MLD 310 receives the BSR, AP MLD 310 knows at least the following: the trigger frame was received, the allocated RU was idle, STA MLD 320 was not able to send data due to some other error, and/or STA MLD 320 still has UL data available (e.g., UL data buffered) and expects to receive a trigger frame from AP MLD 310. Accordingly, AP MLD 310 can use the BSR information to determine to send a new trigger frame to STA MLD 320.

In example 850, link 865 is the PTL and STA MLD 320 has buffered UL data on TID=0.

STA 822 may transmit EDCA TXOP 852 with UL data and TID=0, on link 861.

Concurrently, on link 865, AP 814 may transmit trigger frame 860 with TID=0.

STA 824 may transmit Quality of Service (QoS) Null and BSR 862 for the duration of the allocated RU (e.g., during the reserved RU) corresponding to trigger frame 860.

AP 812 may receive EDCA TXOP 852 and transmit BA 854 accordingly.

AP 814 may receive QoS Null and BSR 862, and transmit BA 864 accordingly.

Based on QoS Null and BSR 862, AP MLD 310 may schedule a new trigger frame.

Figure 8D:
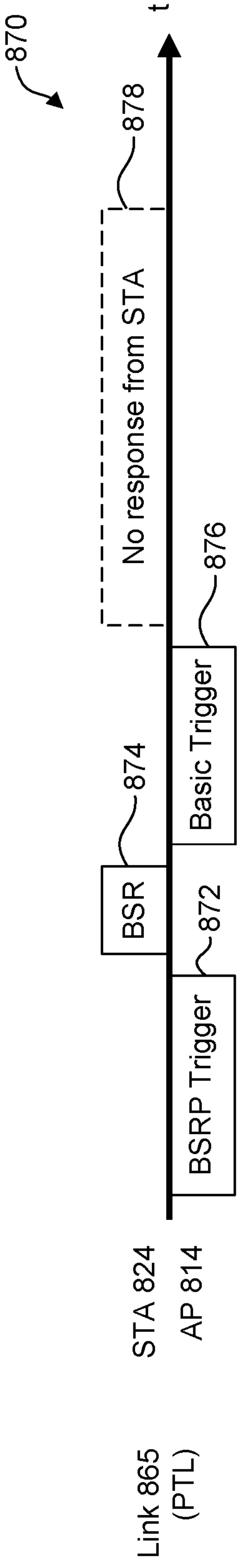
FIG. 8D illustrates an example of multiple trigger frames in a transmission opportunity (TXOP) with no response, according to some embodiments of the disclosure.

FIG. 8D illustrates example 870 of multiple trigger frames in a TXOP with no response, according to some embodiments of the disclosure. For explanation purposes and not a limitation, FIG. 8D may be described with reference to elements from other figures in the disclosure such as FIG. 8A. In some examples, AP MLD 310 may transmit multiple trigger frames in a TXOP. If a first response to a first trigger is received correctly but a second response to a second trigger is not received, AP MLD 310 may determine that the lack of the second response may be due to an error of STA MLD 320. The first trigger and the first response have set the network allocation vector (NAV) around AP MLD 310 and the responding STA MLD 320, so Wireless Local Area Network (WLAN) interference is not likely the cause of the error (e.g., causing the lack of the second response.) Accordingly, AP MLD 310 may ignore the failure of the second response and determine to transmit a trigger frame again.

In example 870, link 865 is the PTL.

AP 814 may transmit Buffer Status Report Poll (BSRP) trigger 872.

STA 824 may receive BSRP trigger 872 and in response, transmit BSR 874.

AP 814 may transmit basic trigger frame 876 after receiving BSR 874.

AP 814 does not receive a response to basic trigger frame 876 as noted by no response 878.

Subsequently, AP MLD 310 may ignore the failure of the second response (e.g., no response 878) and determine to transmit a basic trigger frame again.

Figure 8E:
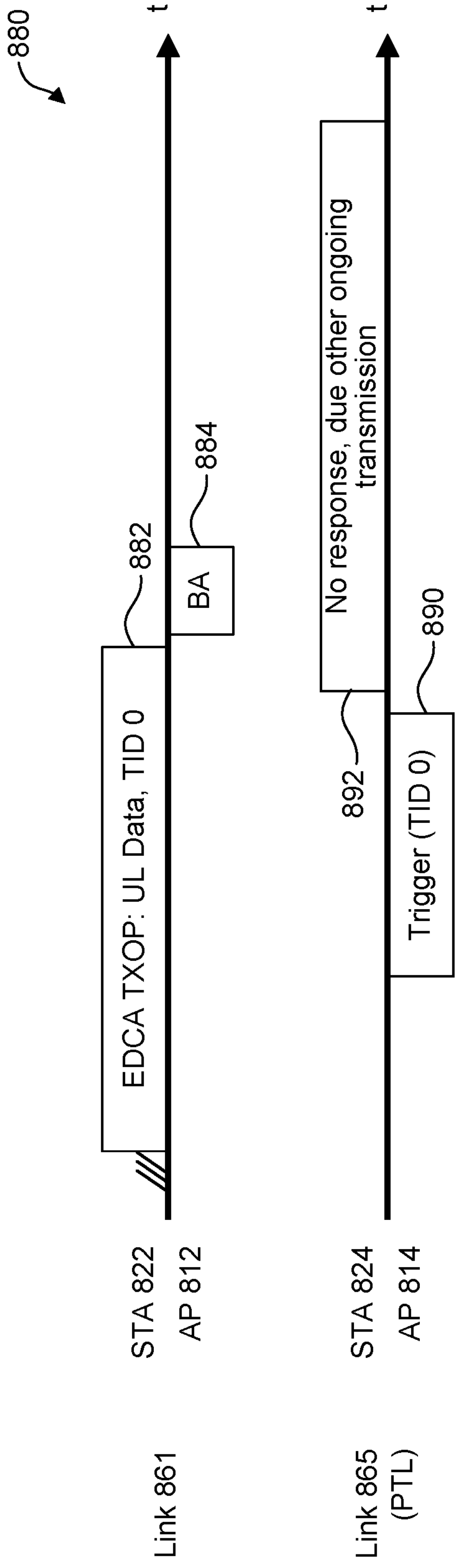
FIG. 8E illustrates an example of transmitting a statistic report corresponding to a triggering operation, according to some embodiments of the disclosure.

FIG. 8E illustrates example 880 of transmitting a statistic report corresponding to a triggering operation, according to some embodiments of the disclosure. For explanation purposes and not a limitation, FIG. 8E may be described with reference to elements from other figures in the disclosure such as FIG. 8B. In some examples, STA MLD 310 may not be able to transmit a response to a trigger frame. In some instances, STA MLD 310 may not have any time to report to explain why a response to the trigger frame failed. Consequently, AP MLD 310 does not know whether STA MLD 320 missed the trigger frame, or if there was another reason why STA MLD 320 did not respond to the trigger frame. In some embodiments, STA MLD 320 calculates statistics and transmits the statistics to AP MLD 310. In some examples, STA MLD 320 transmits the statistics to AP MLD 310 as a response to a BSRP trigger frame, or a as a response to a new trigger frame. In some examples STA MLD 320 may transmit an unsolicited statistics frame if STA MLD 320 detects errors in the trigger frame responses and wants to inform AP MLD 310. In some examples, the statistics may be listed in an A-Control field in a MAC header that is transmitted to AP MLD 310.

In example 880, link 865 is the PTL.

STA 822 may transmit EDCA TXOP 882 with UL data and TID=0, on link 861.

Concurrently, on link 865, AP 814 may transmit trigger frame 890 with TID=0.

STA 824 may not respond to corresponding to trigger frame 890 as indicated by no response 892.

AP 812 may receive EDCA TXOP 882 and transmit BA 884 accordingly.

Subsequently, STA MLD 320 may calculate statistics that are link-specific and/or trigger frame specific and send the statistics: i) as a response to a BSRP trigger frame or in response to a new trigger frame; ii) in an unsolicited statistics frame; and/or iii) list the statistics in an A-Control field in a MAC header. In some embodiments, STA MLD 320 calculates separate statistics according to the type of trigger frame (e.g., basic, multi-user (MU) ready to send (RTS), BSRP, MU-BlockAck Request (BAR).) The size of the trigger response statistics may be 2 octets. Some examples of trigger response statistics include but are not limited to the following:

#of Received Trigger frames allocating RU to STA
#of Responded trigger frames
#of No response due lack of data
#of No response due another transmission ongoing in another link
#of No response due a P2P transmission ongoing
#of No response due allocated RU was busy (e.g., clear channel assessment (CCA) Busy)

Figure 10:
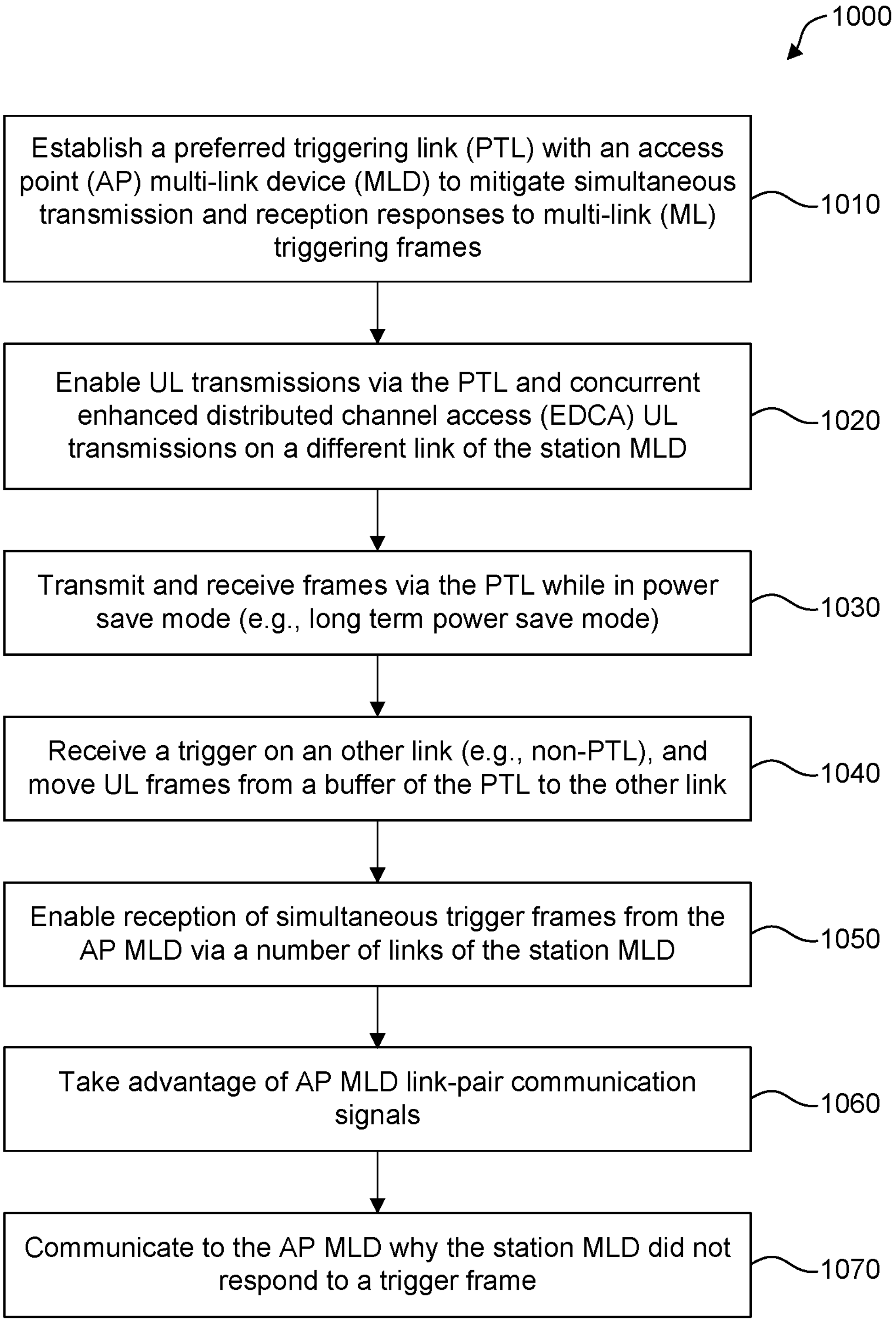
FIG. 10 illustrates an example method for a station (STA) MLD supporting triggered ML access coordination, according to some embodiments of the disclosure.

FIG. 10 illustrates example method 1000 for a STA MLD supporting triggered ML access coordination, according to some embodiments of the disclosure. For explanation purposes and not a limitation, FIG. 10 may be described with reference to elements from other figures in the disclosure. For example, method 1000 may be performed by STA MLD 320 that includes STA 322, STA 324, and STA 326 of FIG. 3 and/or system 200 of FIG. 2. STA MLD 320 may communicate with AP MLD 310 that includes AP 312, AP 314, and AP 316 via corresponding links of FIG. 3.

At 1010, STA MLD 320 can establish a PTL with AP MLD 310 to mitigate simultaneous transmission and reception (STR) responses to ML triggering frames. For example, STA MLD 320 may transmit an indication of PTL, link 361, corresponding to STA 322, and receive a first trigger frame (e.g., trigger frame 322) via the PTL, link 361. In response to the first trigger frame, STA MLD 320 can transmit first UL data (e.g., UL TB data 334) already stored in a buffer corresponding to the PTL via the PTL, link 361. In some embodiments, the transmission of the indication of the PTL can be via an A-Control field or via a management frame. In some embodiments, the PTL corresponds to a link (e.g., a respective transceiver associated with a link) with a lower or the least co-existence usage compared to remaining links associated with respective transceivers of STA MLD 320.

At 1020, STA MLD 320 can enable EDCA UL transmissions on a non-PTL link of STA MLD 320. For example, STA MLD 320 determines that the PTL is busy (e.g., AP MLD 110 may be using the PTL to communicate with a STA not shown in FIG. 3), and transmits second UL data (e.g., UL EDCA data 340) via a second link (e.g., link 365) corresponding to a second transceiver (STA 324).

At 1030, STA MLD 320 can transmit and receive frames via the PTL (e.g., PTL 471 of FIG. 4B) while in power save mode (e.g., long term power save mode). For example, STA MLD 320 operates power save mode on multiple links. Only the PTL is activated to fetch DL data and transmit UL data.

At 1040, STA MLD 320 can receive a trigger on another link (e.g., non-PTL), and move UL frames from a buffer of the PTL to the other link. For example, STA MLD 320 can receive a trigger frame (e.g., trigger frame 420 of FIG. 4A) on a second link (e.g., link 465 of FIG. 4A), where the trigger frame corresponds to a long resource duration. In response to the trigger frame, STA MLD 320 can move second UL data already stored in the buffer corresponding to the PTL (e.g., link 461), to a second buffer corresponding to the second link, and transmit the second UL data from the second buffer via the second link. In some examples, STA MLD 320 can be configured to use a first TID to transmit the first UL data via the PTL (e.g., PTL 481 of FIG. 4C), and a second TID to transmit the second UL data via the second link (e.g., PTL 487 of FIG. 4C).

At 1050, STA MLD 320 can enable reception of simultaneous trigger frames from the AP MLD via a number of links of the station MLD. For example, STA MLD 320 can assign ranges of TIDs to the PTL (e.g., PTL 481 of FIG. 4C) and another range to another link (e.g., link PTL 487 of FIG. 4C) of STA MLD 320. STA MLD 320 can receive concurrently with the first trigger frame, a second trigger frame via a second PTL (e.g., trigger frame 670 of link 665) corresponding to a second transceiver (e.g., STA 624), and where the second PTL corresponds to a second range of TIDs. STA MLD 320 can transmit second UL data via the second PTL using a TID of the second range of TIDs.

At 1060, STA MLD 320 can take advantage of AP MLD link-pair communication signals. STA MLD 320 may receive a communication signal comprising an AP MLD link-pair (e.g., AP MLD 710 with link-pairs AP 714 and AP 716) corresponding to the PTL and an other link of the two or more transceivers. In some embodiments, STA MLD 320 can receive a DL retransmission corresponding to one TID via both links of the AP MLD link-pair.

At 1070, STA MLD 320 can communicate to the AP MLD reasons why the STA MLD did not respond to a trigger frame. In some examples, STA MLD 320 can receive a second trigger frame via the PTL, while transmitting second UL data on another link via a second transceiver of the two or more transceivers, and transmit an error message in response to the second trigger frame. STA MLD 320 can transmit third UL data via the PTL in a remaining transmission time of a reserved RU corresponding to the second trigger frame.

In some embodiments, STA MLD 320 can receive a second trigger frame via the PTL, while transmitting second UL data on another link via a second transceiver of the two or more transceivers, and transmit a BSR and QoS Null frames for a duration of a reserved RU corresponding to the second trigger frame. In some embodiments, STA MLD 320 can receive a second trigger frame via the PTL, while transmitting second UL data on another link via a second transceiver of the two or more transceivers, calculate statistics comprising link-specific and trigger-frame specific, and transmit the statistics to AP MLD 320.

Figure 11:
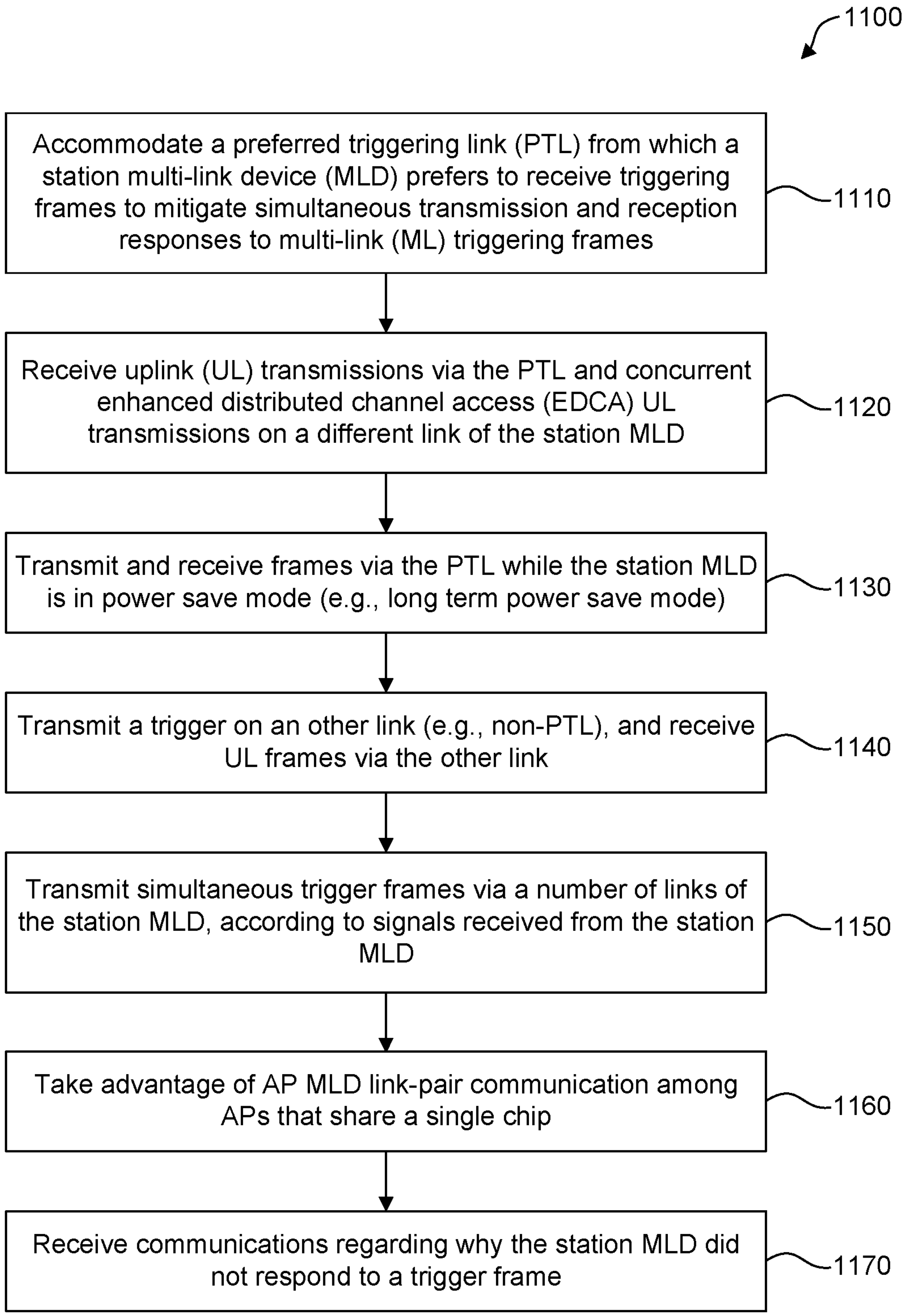
FIG. 11 illustrates an example method for an AP MLD supporting triggered ML access coordination, according to some embodiments of the disclosure.

FIG. 11 illustrates example method 1100 for an AP MLD supporting triggered ML access coordination, according to some embodiments of the disclosure. For explanation purposes and not a limitation, FIG. 11 may be described with reference to elements from other figures in the disclosure. For example, method 1100 may be performed by AP MLD 310 that includes AP 312, AP 314, and AP 316 of FIG. 3 and/or system 200 of FIG. 2. AP MLD 310 may communicate with STA MLD 320 that includes STA 322, STA 324, and STA 326 of FIG. 3 via corresponding links of FIG. 3.

At 1110, AP MLD 310 can accommodate a request for a PTL from STA MLD 320 that indicates a preference for receiving triggering frames to mitigate triggering responses to ML triggering frames. For example, AP MLD 310 can receive from STA MLD 320, an indication of a PTL corresponding to a first transceiver of the two or more transceivers, and prepare buffered DL frames for transmission via the PTL. AP MLD 310 can transmit a first trigger frame via the PTL, and in response to the first trigger frame, receive first UL data via the PTL.

At 1120, AP MLD 310 can communicate via the PTL (e.g., with a device other than STA MLD 320) and concurrently receive EDCA UL transmissions on a non-PTL link of STA MLD 320.

At 1130, AP MLD 310 can transmit and receive frames via the PTL while the STA MLD 320 is in power save mode (e.g., long term power save mode).

At 1140, AP MLD 310 can transmit a trigger on another link (e.g., non-PTL), and receive UL frames via the other link that is not the PTL.

At 1150, AP MLD 310 can transmit simultaneous trigger frames via a number of links of STA MLD 320 according to signals received from the STA MLD 320. For example, when the PTL corresponds to a first range of TIDs, AP MLD 310 can transmit concurrently with the first trigger frame, a second trigger frame via a second PTL corresponding to a second transceiver of the two or more transceivers, where the second PTL corresponds to a second range of TIDs, and receive second UL data via the second PTL using a TID of the second range of TIDs.

At 1160, AP MLD 310 can take advantage of AP MLD link-pair communication among APs that share a single chip. For example, AP MLD 310 can transmit a communication signal comprising an AP MLD link-pair corresponding to the PTL and another link associated with a respective one of the two or more transceivers, where transceivers corresponding to the AP MLD link-pair reside on a common chip. AP MLD 31 can transmit a DL retransmission corresponding to one TID via both links of the AP MLD link-pair.

At 1170, AP MLD 310 can receive communications indicating one or more reasons why the STA MLD 320 did not respond to a trigger frame. For example, AP MLD 310 can transmit a second trigger frame via the PTL, receive an error message in response to the second trigger frame, and receive third UL data via the PTL in a remaining transmission time of a reserved RU corresponding to the second trigger frame. In some embodiments, AP MLD 310 can transmit a second trigger frame via the PTL, and receive a BSR and QoS Null frames for a duration of a reserved RU corresponding to the second trigger frame, or receive link-specific and trigger-frame specific statistics.

Figure 12:
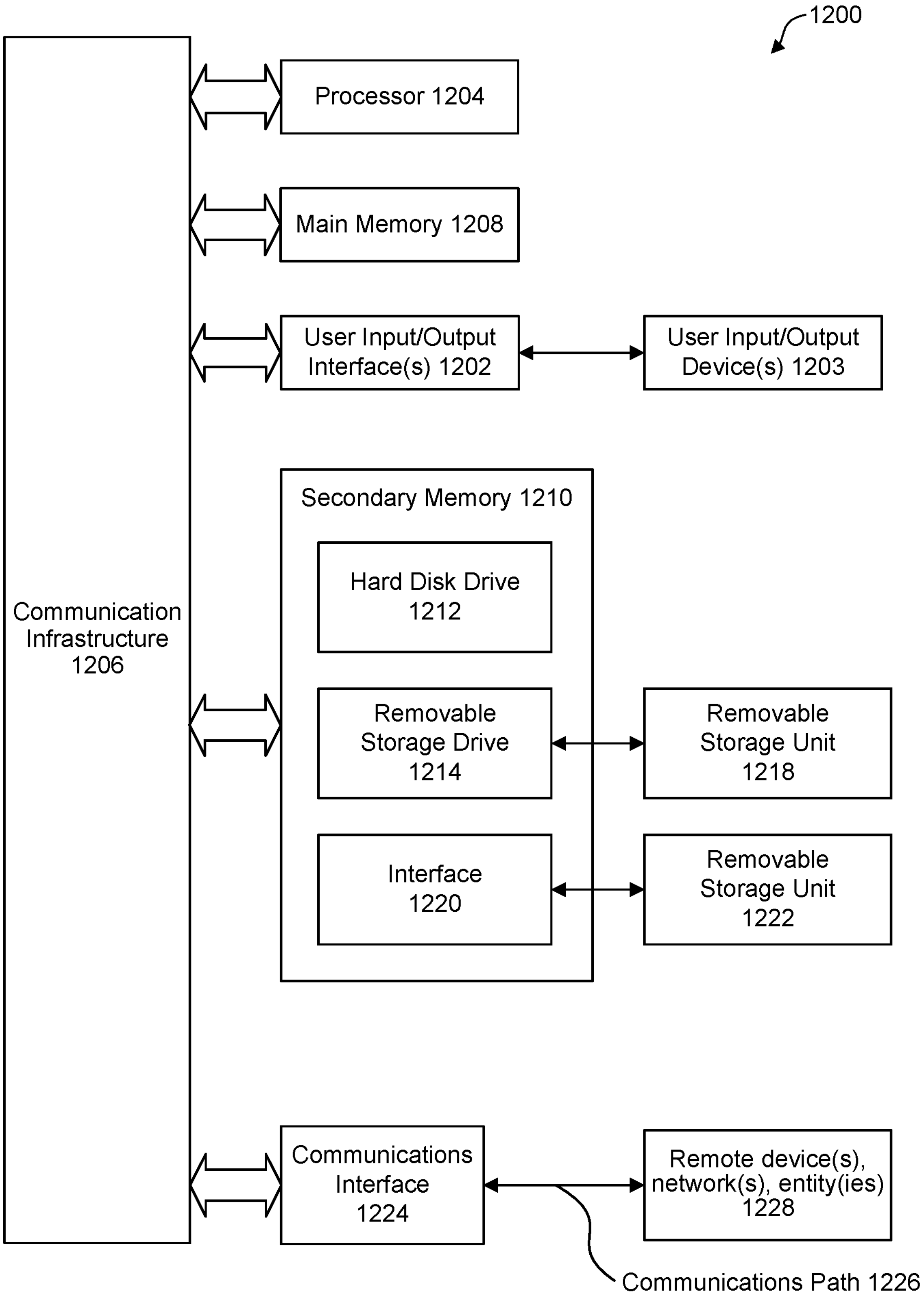
FIG. 12 is an example computer system for implementing some embodiments or portion(s) thereof.

Various embodiments can be implemented, for example, using one or more well-known computer systems, such as computer system 1200 shown in FIG. 12. Computer system 1200 can be any well-known computer capable of performing the functions described herein. For example, and without limitation, STA MLD 120 and/or AP MLD 110 of FIG. 1, system 200 of FIG. 2, method 1000 of FIG. 10, method 1100 of FIG. 11, (and/or other apparatuses and/or components shown in the figures) may be implemented using computer system 1200, or portions thereof.

Computer system 1200 includes one or more processors (also called central processing units, or CPUs), such as a processor 1204. Processor 1204 is connected to a communication infrastructure 1206 that can be a bus. One or more processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202. Computer system 1200 also includes a main or primary memory 1208, such as random access memory (RAM). Main memory 1208 may include one or more levels of cache. Main memory 1208 has stored therein control logic (e.g., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to some embodiments, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1200, main memory 1208, secondary memory 1210 and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 12. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A station (STA) multi-link device (MLD), comprising:
a first transceiver and a second transceiver; and
a processor communicatively coupled to the first transceiver and the second transceiver, configured to:
transmit, via the first transceiver, an indication that a preferred triggering link (PTL) is associated with a first link of the STA MLD, wherein the first link is associated with the first transceiver, wherein a second link of the STA MLD is associated with the second transceiver;
receive, via the PTL, a first trigger frame;
subsequent to receiving the first trigger frame, transmit, via the PTL, one or more first uplink (UL) frames comprising first UL data stored in a buffer associated with the PTL;
obtain a second UL frame for transmission, wherein STAs of the STA MLD are in a power save mode; and
activate a first STA of the STAs to transmit the second UL frame via the PTL, wherein the first STA comprises the first transceiver corresponding to the PTL.

2. The STA MLD according to claim 1, wherein the processor is further configured to:
determine that the PTL is busy after receiving the first trigger frame; and
transmit a third UL frame comprising second UL data via the second link.

3. The STA MLD according to claim 1, wherein the indication of the PTL is transmitted via an A-Control field or via a management frame.

4. The STA MLD according to claim 1, wherein the processor is further configured to:
receive one or more downlink (DL) frames via the PTL subsequent to transmitting the second UL frame.

5. The STA MLD according to claim 1, wherein the PTL corresponds to a link with fewer peer-to-peer communications than a remaining link associated with the first and second transceivers.

6. The STA MLD according to claim 1, wherein the processor is further configured to:
receive a second trigger frame on the second link, wherein the second trigger frame corresponds to a long resource duration; and
transmit a third UL frame comprising second UL data corresponding to the PTL via the second link.

7. The STA MLD according to claim 6, wherein the processor is further configured to use a first traffic ID (TID) to transmit the first UL data via the PTL, and a second TID to transmit the second UL data via the second link.

8. The STA MLD according to claim 1, wherein the PTL corresponds to a first range of traffic IDs (TIDs), and the processor is further configured to:
receive concurrently with the first trigger frame, a second trigger frame via a second PTL corresponding to the second transceiver, wherein the second PTL corresponds to a second range of TIDs; and
transmit a third UL frame comprising second UL data via the second PTL using a TID corresponding to the second range of TIDs.

9. The STA MLD according to claim 1, wherein the processor is further configured to receive a communication signal comprising an access point (AP) MLD link-pair corresponding to the PTL and an other link corresponding to the first and second transceivers.

10. The STA MLD according to claim 9, wherein the processor is further configured to receive, via both links of the AP MLD link-pair, a downlink (DL) retransmission corresponding to one traffic ID (TID).

11. The STA MLD according to claim 1, wherein the processor is further configured to:
receive a second trigger frame via the PTL while transmitting second UL data on an other link via the second transceiver;
transmit an error message in response to the second trigger frame; and
transmit a third UL frame comprising third UL data via the PTL in a remaining transmission time of a reserved resource unit (RU) corresponding to the second trigger frame.

12. The STA MLD according to claim 1, wherein the processor is further configured to:
receive a second trigger frame via the PTL while transmitting second UL data on an other link via the second transceiver; and
transmit a Buffer Status Report (BSR) and Quality of Service (QoS) Null frames for a duration of a reserved resource unit (RU) corresponding to the second trigger frame.

13. The STA MLD according to claim 1, wherein the processor is further configured to:
receive a second trigger frame via the PTL while transmitting second UL data on an other link via the second transceiver; and transmit at least one of a link-specific statistic or trigger-frame specific statistic.

14. An access point (AP) multi-link device (MLD), comprising:

a first transceiver and a second transceiver; and a processor communicatively coupled to the first transceiver and the second transceiver, configured to:

receive, via the first transceiver, an indication that a preferred triggering link (PTL) is associated with a first link of a station (STA) MLD, wherein the first link is associated with the first transceiver, wherein a second link of the STA MLD is associated with the second transceiver;

transmit, via the PTL, a first trigger frame;

subsequent to transmitting the first trigger frame, receive, via the PTL, one or more first uplink (UL) frames comprising UL data stored in a buffer associated with the PTL; and receive, via the PTL, a second UL frame comprising a signal indicating that the AP MLD can send buffered downlink (DL) data to the STA MLD.

15. The AP MLD according to claim 14, wherein the PTL corresponds to a first range of traffic IDs (TIDs), and the processor is further configured to:

transmit via a second PTL, a second trigger frame concurrently with the first trigger frame, wherein the second PTL corresponds to the second transceiver, and wherein the second PTL corresponds to a second range of TIDs; and receive via the second PTL, a third UL frame comprising second UL data using a TID corresponding to the second range of TIDs.

16. The AP MLD according to claim 14, wherein the processor is further configured to:

transmit a communication signal comprising an AP MLD link-pair corresponding to the PTL and an other link associated with a respective one of the first and second transceivers, wherein transceivers corresponding to the AP MLD link-pair reside on a common chip; and transmit via both links of the AP MLD link-pair, a DL retransmission corresponding to one traffic ID (TID).

17. The AP MLD according to claim 14, wherein the processor is further configured to:

transmit a second trigger frame via the PTL;

receive an error message in response to the second trigger frame; and receive a third UL frame comprising second UL data via the PTL in a remaining transmission time of a reserved resource unit (RU) corresponding to the second trigger frame.

18. The AP MLD according to claim 14, wherein the processor is further configured to:

transmit a second trigger frame via the PTL; and receive a Buffer Status Report (BSR) and Quality of Service (QoS) Null frames for a duration of a reserved resource unit (RU) corresponding to the second trigger frame, or receive a link-specific statistic or a trigger-frame specific statistic.

19. A method of operating a station (STA) multi-link device (MLD), comprising:

transmitting an indication that a preferred triggering link (PTL) is associated with a first link of the STA MLD, wherein the first link is associated with a first transceiver of the STA MLD, wherein a second link of the STA MLD is associated with a second transceiver of the STA MLD;

receiving, via the PTL, a first trigger frame;

subsequent to receiving the first trigger frame, transmitting, via the PTL, one or more first uplink (UL) frames comprising first UL data stored in a buffer associated with the PTL;

obtaining a second UL frame for transmission, wherein STAs of the STA MLD are in a power save mode; and activating a first STA of the STAs to transmit the second UL frame via the PTL, wherein the first STA comprises the first transceiver corresponding to the PTL.

20. The method according to claim 19, further comprising:

receiving multi-user (MU) enhanced distributed channel access (EDCA) parameters via the PTL;

determining that the PTL is busy; and transmitting via the second link of the STA MLD, in response to the determination, a third UL frame comprising second UL data.

* * * * *